United States Patent
Iwamatsu et al.

[11] Patent Number: 5,987,071
[45] Date of Patent: Nov. 16, 1999

[54] DIGITAL MODULATOR AND DIGITAL DEMODULATOR

[75] Inventors: Takanori Iwamatsu; Mitsuo Kakuishi, both of Kawasaki, Japan

[73] Assignee: Fujitsu Limited, Kanagawa, Japan

[21] Appl. No.: 09/057,698

[22] Filed: Apr. 9, 1998

Related U.S. Application Data

[62] Division of application No. 08/764,969, Dec. 13, 1996, Pat. No. 5,781,076.

[30] Foreign Application Priority Data

Jul. 2, 1996 [JP] Japan ..................... 8-172220

[51] Int. Cl.⁶ .............. H04L 27/36; H03C 3/00; H03C 3/04; H04B 1/00
[52] U.S. Cl. ............. 375/298; 332/103; 332/125; 455/61
[58] Field of Search ............. 375/298, 261, 375/295; 332/103, 125, 160, 159; 455/61

[56] References Cited

U.S. PATENT DOCUMENTS 5,519,356  5/1996  Greenberg ................. 375/327

FOREIGN PATENT DOCUMENTS 03265332  11/1991  Japan .
05344168  12/1993  Japan .
06104943  4/1994  Japan .
06069969  6/1995  Japan .
07143196  6/1995  Japan .

*Primary Examiner*—Stephen Chin
*Assistant Examiner*—Albert Park
*Attorney, Agent, or Firm*—Helfgott & Karas, PC.

[57] ABSTRACT

A digital modulator and digital demodulator with quadrature amplitude modulation (QAM) schemes, which are designed to modulate or demodulate RZ-coded baseband signals. The digital modulator comprises first to fourth roll-off filters and a first and second inverters connected to the second and fourth roll-off filters. It also comprises a parallel-to-serial converter to successively selects the outputs of the first roll-off filter, third roll-off filter, first inverter, and second inverter. A D/A converter converts the selected digital signal stream into an analog signal. The roll-off filters and inverters operate at a predetermined clock frequency, while the parallel-to-serial converter and the D/A converter work at a frequency four times the predetermined clock frequency. The digital demodulator reverses the above modulation process to reproduce the baseband signals.

3 Claims, 22 Drawing Sheets

| SYMBOL TIME | I-CH OUTPUT / 4-TIMES SAMPLING | |
|---|---|---|
| n-2 | ...$I_n \times \alpha_6 + I_{n-1} \times \alpha_2 + I_{n-2} \times \alpha_2 + I_{n-3} \times \alpha_6 + I_{n-4} \times \alpha_{10}..$ | C |
| | ...$I_n \times \alpha_5 + I_{n-1} \times \alpha_1 + I_{n-2} \times \alpha_3 + I_{n-3} \times \alpha_7 + I_{n-4} \times \alpha_{11}..$ | D |
| n-1 | ...$I_{n+1} \times \alpha_8 + I_n \times \alpha_4 + I_{n-1} \times \alpha_0 + I_{n-2} \times \alpha_4 + I_{n-3} \times \alpha_8...$ | A |
| | ...$I_{n+1} \times \alpha_7 + I_n \times \alpha_3 + I_{n-1} \times \alpha_1 + I_{n-2} \times \alpha_5 + I_{n-3} \times \alpha_9...$ | B |
| | ...$I_{n+1} \times \alpha_6 + I_n \times \alpha_2 + I_{n-1} \times \alpha_2 + I_{n-2} \times \alpha_6 + I_{n-3} \times \alpha_{10}..$ | C |
| | ...$I_{n+1} \times \alpha_5 + I_n \times \alpha_1 + I_{n-1} \times \alpha_3 + I_{n-2} \times \alpha_7 + I_{n-3} \times \alpha_{11}..$ | D |
| n | ...$I_{n+2} \times \alpha_8 + I_{n+1} \times \alpha_4 + I_n \times \alpha_0 + I_{n-1} \times \alpha_4 + I_{n-2} \times \alpha_8...$ | A |
| | ...$I_{n+2} \times \alpha_7 + I_{n+1} \times \alpha_3 + I_n \times \alpha_1 + I_{n-1} \times \alpha_5 + I_{n-2} \times \alpha_9...$ | B |
| | ...$I_{n+2} \times \alpha_6 + I_{n+1} \times \alpha_2 + I_n \times \alpha_2 + I_{n-1} \times \alpha_6 + I_{n-2} \times \alpha_{10}..$ | C |
| | ...$I_{n+2} \times \alpha_5 + I_{n+1} \times \alpha_1 + I_n \times \alpha_3 + I_{n-1} \times \alpha_7 + I_{n-2} \times \alpha_{11}..$ | D |
| n+1 | ...$I_{n+3} \times \alpha_8 + I_{n+2} \times \alpha_4 + I_{n+1} \times \alpha_0 + I_n \times \alpha_4 + I_{n-1} \times \alpha_8...$ | A |
| | ...$I_{n+3} \times \alpha_7 + I_{n+2} \times \alpha_3 + I_{n+1} \times \alpha_1 + I_n \times \alpha_5 + I_{n-1} \times \alpha_9...$ | B |

FIG. 5

| SYMBOL TIME | Q-CH OUTPUT / 4-TIMES SAMPLING | |
|---|---|---|
| n-2 | ...$Q_n \times \alpha_6 + Q_{n-1} \times \alpha_2 + Q_{n-2} \times \alpha_2 + Q_{n-3} \times \alpha_6 + Q_{n-4} \times \alpha_{10}$.. | C |
|  | ...$Q_n \times \alpha_5 + Q_{n-1} \times \alpha_1 + Q_{n-2} \times \alpha_3 + Q_{n-3} \times \alpha_7 + Q_{n-4} \times \alpha_{11}$.. | D |
| n-1 | ...$Q_{n+1} \times \alpha_8 + Q_n \times \alpha_4 + Q_{n-1} \times \alpha_0 + Q_{n-2} \times \alpha_4 + Q_{n-3} \times \alpha_8$... | A |
|  | ...$Q_{n+1} \times \alpha_7 + Q_n \times \alpha_3 + Q_{n-1} \times \alpha_1 + Q_{n-2} \times \alpha_5 + Q_{n-3} \times \alpha_9$... | B |
|  | ...$Q_{n+1} \times \alpha_6 + Q_n \times \alpha_2 + Q_{n-1} \times \alpha_2 + Q_{n-2} \times \alpha_6 + Q_{n-3} \times \alpha_{10}$.. | C |
|  | ...$Q_{n+1} \times \alpha_5 + Q_n \times \alpha_1 + Q_{n-1} \times \alpha_3 + Q_{n-2} \times \alpha_7 + Q_{n-3} \times \alpha_{11}$.. | D |
| n | ...$Q_{n+2} \times \alpha_8 + Q_{n+1} \times \alpha_4 + Q_n \times \alpha_0 + Q_{n-1} \times \alpha_4 + Q_{n-2} \times \alpha_8$... | A |
|  | ...$Q_{n+2} \times \alpha_7 + Q_{n+1} \times \alpha_3 + Q_n \times \alpha_1 + Q_{n-1} \times \alpha_5 + Q_{n-2} \times \alpha_9$... | B |
|  | ...$Q_{n+2} \times \alpha_6 + Q_{n+1} \times \alpha_2 + Q_n \times \alpha_2 + Q_{n-1} \times \alpha_6 + Q_{n-2} \times \alpha_{10}$.. | C |
|  | ...$Q_{n+2} \times \alpha_5 + Q_{n+1} \times \alpha_1 + Q_n \times \alpha_3 + Q_{n-1} \times \alpha_7 + Q_{n-2} \times \alpha_{11}$.. | D |
| n+1 | ...$Q_{n+3} \times \alpha_8 + Q_{n+2} \times \alpha_4 + Q_{n+1} \times \alpha_0 + Q_n \times \alpha_4 + Q_{n-1} \times \alpha_8$... | A |
|  | ...$Q_{n+3} \times \alpha_7 + Q_{n+2} \times \alpha_3 + Q_{n+1} \times \alpha_1 + Q_n \times \alpha_5 + Q_{n-1} \times \alpha_9$... | B |

FIG. 6

| | | $A_I$ | $B_I$ | $C_I$ | $D_I$ |
|---|---|---|---|---|---|
| I-CH ROLL-OFF FILTER OUTPUT | | $A_I$ | $B_I$ | $C_I$ | $D_I$ |
| Q-CH ROLL-OFF FILTER OUTPUT | | $A_Q$ | $B_Q$ | $C_Q$ | $D_Q$ |
| CARRIER FREQUENCY = SYMBOL RATE (PART-1) | COS | 1 | 0 | $-1$ | 0 |
| | SIN | 0 | 1 | 0 | $-1$ |
| | MODULATOR OUTPUT | $A_I$ | $B_Q$ | $-C_I$ | $-D_Q$ |

| | | $A_I$ | $A_Q$ | $-B_I$ | $-B_Q$ | $C_I$ | $C_Q$ | $-D_I$ | $-D_Q$ |
|---|---|---|---|---|---|---|---|---|---|
| CARRIER FREQUENCY = 2 × SYMBOL RATE (PART-2) | COS | 1 | 0 | $-1$ | 0 | 1 | 0 | $-1$ | 0 |
| | SIN | 0 | 1 | 0 | $-1$ | 0 | 1 | 0 | $-1$ |
| | MODULATOR OUTPUT | $A_I$ | $A_Q$ | $-B_I$ | $-B_Q$ | $C_I$ | $C_Q$ | $-D_I$ | $-D_Q$ |

FIG. 10

DIGITAL MODULATOR AND DIGITAL DEMODULATOR

This is a division of application Ser. No. 08/764,969, filed Dec. 13, 1996 now U.S. Pat. No. 5,781,076.

BACKGROUND OF THE INVENTION

1. Field of the Invention

The present invention relates to digital modulators and digital demodulators with quadrature amplitude modulation (QAM) schemes, and more specifically, to a digital modulator and a digital demodulator used in multiplexed channel radio communications equipment, cable television (CATV) systems, and the like.

2. Description of the Related Art

The use of digital signal processing technologies has become dominant in actual implementation of modulators and demodulators with quadrature amplitude modulation (QAM) schemes. It is because the digital technologies, when compared to analog technologies, provide better accuracy and enable easier integration of QAM functionalities into an LSI chip. However, as the number of data bits for each symbol is increased, it becomes necessary to expand the scale of digital circuits of a modulator or demodulator in order to process an increased amount of data, thus causing some problems in costs and power consumption of the circuits. To solve such problems, designers have been urged to devise some methods of reducing the scale of digital modulator and demodulator circuits. In such a circumstance, the present invention provide solutions for the increasing demands.

The following items (i) to (v) will explain some specific configurations of conventional QAM modulators and demodulators, for basic understanding of backgrounds of their potential problems.

(i) FIG. 18 is a block diagram showing a conventional digital modulator. Two baseband signals of an in-phase channel (I-ch) and a quadrature channel (Q-ch) are supplied to their respective roll-off filters 101 and 102 for rejecting off-range frequency signals to minimize the intersymbol interference. The two roll-off filters 101 and 102 have identical internal structure as shown in FIG. 19.

Referring to FIG. 19, flip-flops 103*a*, 103*b*, 103*c*, and so on are connected in series, each of which actually carries a multiple-bit value representing each instant amplitude of a baseband signal. Being triggered at intervals of T/4, those flip-flops successively provide the entered baseband signals with T/4 delays, where T is the cycle period of a carrier clock signal. The delayed baseband signals are then supplied to their respective multipliers 104*a*, 104*b*, 104*c*, and so on, which separately multiply the signals by predetermined tap coefficients $\alpha n$, $\alpha_{n-1}$, $\alpha_{n-2}$, and so on at T/4 intervals. An adder 105 then collects the resultant products for calculating their summation at every T/4 period. The tap coefficients are designed to yield a desired impulse response, and the different values are symmetrically arranged along that multiplier array as shown in FIG. 19, with a coefficient $\alpha_0$ placed at the central tap.

Returning to FIG. 18, the outputs of the roll-off filters 101 and 102 are provided to multipliers 106 and 107 for simultaneous multiplication by two orthogonal carrier signals, cos $\omega t$ and sin $\omega t$, respectively. The multiplier 106 multiplies the output of the roll-off filter 101 by a carrier signal cos $\omega t$ at T/4 intervals, while the other multiplier 107 multiplies the output of the other roll-off filter 102 by another carrier signal sin $\omega t$ at the same intervals. An adder 108 calculates a sum of their products at T/4 intervals, thus obtaining a modulated signal in the form of a sequence of digital values. A digital-to-analog (D/A) converter 109 converts this modulated signal into an analog signal also at T/4 intervals. A low-pass filter 110 eliminates alias components, or undesired harmonic frequencies, included in the output of the D/A converter 109.

Assume here that the frequency f of the carrier signals cos $\omega t$ and sin $\omega t$ is equal to the symbol rate. Since the multipliers 106 and 107 operate at intervals of T/4 as described before, the actual waveforms of the carrier signals, cos $\omega t$ and sin $\omega t$, applied to them can be expressed as:

$$\cos \omega t = [1, 0, -1, 0, \ldots] \quad (1a)$$

$$\sin \omega t = [0, 1, 0, -1, \ldots] \quad (1b)$$

Let the output signal sequence of the roll-off filter 101 be $[I_1, I_2, I_3, I_4, \ldots]$, and that of the roll-off filter 102 be $[Q_1, Q_2, Q_3, Q_4, \ldots]$. Based on the values shown in the expressions (1a) and (1b), the modulated signal entered to the D/A converter 109 will be expressed as $[I_1, Q_2, -I_3, -Q_4 \ldots]$.

The result of the above discussion allows such an alternate circuit configuration as illustrated in FIG. 20, where the multipliers 106 and 107 and adder 108 in FIG. 18 are replaced with a combination of inverters 115 and 116 and a parallel-to-serial (P/S) converter 117.

In a digital modulator circuit of FIG. 20, the I-ch baseband signal is supplied to two roll-off filters 111 and 112 and the Q-ch baseband signal is entered to two roll-off filters 113 and 114. These four roll-off filters 111–114, having the same internal structure as shown in FIG. 19, operate at a rate of four times as high as the carrier frequency (or the symbol rate, in this case). The P/S converter 117 has four input terminals A, B, C, and D. The inputs A and B are connected directly to the output of the roll-off filters 111 and 113, respectively. On the other hand, the inputs C and D receive inverted signals of the outputs of the roll-off filters 112 and 114 via inverters 115 and 116, respectively. At the rate of four times the carrier frequency, the P/S converter 117 sequentially and cyclically selects one of those inputs from A toward D and feeds the selected signal to the D/A converter 109.

Such an alternate circuit configuration as shown in FIG. 20 is disclosed in Japanese Patent Laid-open Publications No. 3-265332 (1991) and No. 6-104943 (1994), for example.

(ii) Carrier frequency used in a digital modulator is normally selected to be an integral multiple of its symbol rate, namely, n times the symbol rate. As clarified in FIG. 18, a digitally modulated signal is converted to an analog signal by the D/A converter 109 at T/4 intervals. This D/A conversion process will cause some alias frequency components imposed in the spectrum of the resultant analog signal, of which central frequencies derive from the cycle time of the D/A conversion. The alias can be filtered out by using the low-pass filter 110. As the carrier frequency is lowered, the cutoff frequency of the low-pass filter 110 should also be reduced. Because low-pass filters with low cutoff frequencies are costly in general, a higher carrier frequency is desirable for cost reduction of modulator devices. Therefore, when the ratio of carrier frequency to symbol rate is n:1 (n is an integer), it is desired to set this factor n as high as possible.

(iii) FIG. 21 is a block diagram showing a combination of a conventional digital modulator and demodulator. The modulator shown on the left hand of FIG. 21 has basically the same structure as that in FIG. 18, while FIG. 21 includes some more details. The following description will focus on its distinctive points, maintaining consistent reference numerals for the common elements.

In FIG. 21, a carrier clock signal having a frequency $f_{CLK}$ (i.e., n times the symbol rate) is produced by a carrier frequency oscillator 120. A splitter 121 then divides it into two ways and delivers one as is to the multiplier 106, as well as supplying the other to the multiplier 107 with a phase shift of 90 degrees. Another oscillator 122 generates a signal having a frequency equal to difference between a radio frequency $f_{LO}$ and the carrier frequency $f_{CLK}$. This $f_{LO}-f_{CLK}$ signal is provided to a frequency converter 123 for upconversion of the low-pass filter output. That is, while the frequency content of a modulated signal produced by the low-pass filter 110 is centered around the carrier frequency $f_{CLK}$, the frequency converter 123 shifts it upward to higher radio frequencies by using the $f_{LO}-f_{CLK}$ signal, thereby outputting to a transmission line a modulated radio signal whose spectral density is centered around the radio frequency $f_{LO}$.

On the other hand, a digital demodulator shown in the right half of FIG. 21 reproduces the I-ch and Q-ch signals from the received radio signal through a demodulation process, which applies exactly the same operators as those in the modulation process but in inverse order.

(iv) FIG. 22(A) is a block diagram of a conventional digital demodulator, and FIG. 22(B) illustrates the internal structure of a signal level detector 132 as part of the demodulator in FIG. 22(A).

The reception signal is first sent to an automatic gain control (AGC) circuit 130 for regulating its signal strength to a constant level according to a control signal from the signal level detector 132. An analog-to-digital (A/D) converter 131, coupled to the AGC circuit 130, performs a signal conversion from an analog voltage to a digital value and sends it to a demodulator section 133 and also to the signal level detector 132. The signal level detector 132 detects an average signal level by observing the digital reception signal sent from the A/D converter 131. If the average signal level does not agree with a predetermined level, the signal level detector 132 sends a control signal to the AGC circuit 130, thus regulating the reception signal level.

The details of the signal level detector 132 are shown in FIG. 22(B). An absolute value detector 135 calculates an absolute value of the digital reception signal provided from the A/D converter 131. A subtractor 136 further calculates the difference between the absolute value and a preprogrammed value. The differences are integrated in the time domain by an integrator composed of an adder 137 and a flip-flop 138. The result of this time-integration is converted to an analog signal by a D/A converter 139, for use as the control voltage for the AGC circuit 130.

(v) In the conventional digital modulator shown in FIG. 18, a D/A conversion performed by the D/A converter 109 will cause some distortion in the frequency content of the converted signal. Generally, the frequency response of a D/A converter is expressed as $$|\sin(\omega/2S)|(\omega/2S) \qquad (2)$$

where S is a sampling rate. This Equation (2) implies that the output of a D/A converter loses its gain in a high frequency range, or the first-order attenuation.

The above explanations gave some specific configurations of conventional QAM modulators and demodulators. The following part will now clarify their potential problems, recalling each of the above-described points (i) to (v).

(i) In the conventional digital modulator shown in FIG. 20, it is difficult to increase the number of bits per symbol, because its roll-off filters are too large in circuit scale. Since the number of multipliers integrated therein and the data length of each multiplier are particularly critical to the scale of roll-off filters, it is necessary to reduce the number of multipliers. Also, the roll-off filters in this conventional modulator should operate at a frequency of four times the carrier frequency. Therefore, raising the carrier frequency will result in larger electric power consumed in the roll-off filters.

As such, the reduction of circuit scale and power consumption in roll-off filters are the crucial demands for further enhancement of the conventional digital modulator in FIG. 20.

(ii) Recall that a higher ratio of the carrier frequency to the symbol rate is desirable for cost reduction of modulator devices. This requirement for a higher carrier frequency, however, will naturally cause an increase of the circuit scale since such digital modulators must operate four times as fast as that higher carrier frequency.

(iii) The conventional digital modulator shown in FIG. 21 is equipped with the oscillator 122 to obtain a frequency equal to the difference between radio frequency $f_{LO}$ and carrier frequency $f_{CLK}$. Such a $f_{LO}-f_{CLK}$ oscillator is also required in digital demodulator. However, there is such a problem with those oscillators that their oscillation frequency has to be changed when a different carrier frequency $f_{CLK}$ is requested. In addition, since the carrier frequency is set to an integer multiple (i.e., n times) of the symbol rate, it is necessary to modify the oscillator 122 and its counterpart in the demodulator, when a different multiplication ratio n is required.

(iv) In the conventional digital demodulator shown in FIG. 22, the A/D converter 131 and signal level detector 132 operate at the carrier frequency. Therefore, these devices must work faster to obtain a higher ratio of the carrier frequency to the symbol rate, thus causing an increase in their costs.

(v) Further, in any of the foregoing prior-art digital modulators, a digital-to-analog conversion applied to a modulated signal by a D/A converter will cause a reduction of the high frequency range gain. However, from the viewpoint of compliance with legal regulations on radio wave emission and/or noise immunity, it is desired to keep a flat frequency response.

SUMMARY OF THE INVENTION

Taking the above into consideration, a first object of the present invention is to provide a digital modulator which enables downsizing of roll-off filter circuits and reduction of their power consumption.

A second object of the present invention is to provide a digital modulator whose circuit size is not increased even when a higher value is selected for the ratio of carrier frequency to symbol rate.

A third object of the present invention is to provide a digital modulator and a digital demodulator in which a local oscillator for frequency conversion can be used without modification even if the carrier frequency is required to change.

A fourth object of the present invention is to provide a digital demodulator which avoids cost increase in an AGC circuit, even when a higher ratio of carrier frequency to symbol rate is selected.

A fifth object of the present invention is to provide a digital modulator in which the modulated signal converted by a D/A converter is compensated to obtain a flat frequency response.

To accomplish the above objects, according to the present invention, there is provided a digital modulator with a quadrature amplitude modulation scheme. The digital modulator comprises a first and a second roll-off filters for transmitting a desired frequency range of a return-to-zero coded I-channel baseband signal, a third and a fourth roll-off filters for transmitting a desired frequency range of a return-to-zero coded Q-channel baseband signal. The modulator also comprises first and second inverting means for inverting the outputs of the second roll-off filter and fourth roll-off filter, respectively. The above six structural elements all operate at a first predetermined clock frequency. The modulator further comprises selection means and D/A conversion means operating at a second predetermined clock frequency that is four times as high as the first predetermined clock frequency. The selection means successively selects one of a first to fourth input signals, where the first to fourth input signals are the respective outputs of the first roll-off filter, the third roll-off filter, the first inverting means, and the second inverting means. The D/A conversion means converts the output of the selection means into an analog signal.

To accomplish the above objects, there is also provided a digital demodulator having a demodulation circuit with a quadrature amplitude modulation scheme. The digital demodulator comprises carrier signal supplying means for supplying the demodulation circuit with a carrier signal having a carrier frequency derived from a symbol rate, and radio frequency generation means for generating a radio frequency signal having a predetermined radio frequency. The demodulator further comprises difference frequency generation means and downconversion means. The difference frequency generation means generates a difference frequency signal by using the carrier signal produced by the carrier signal supplying means and the radio frequency signal generated by the radio frequency generation means. The difference frequency signal has a frequency equal to the difference between the predetermined radio frequency and the carrier frequency. The downconversion means converts a frequency or a radio input signal down to the carrier frequency by using the difference frequency signal generated by the difference frequency generation means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing outputs of an I-ch roll-off filter;

FIG. 6 is a diagram showing outputs of a Q-ch roll-off filter;

FIG. 10 is a diagram showing the operation of the fourth embodiment, where carrier frequency is twice as high as its symbol rate;

DESCRIPTION OF THE PREFERRED EMBODIMENTS

Figure 1:
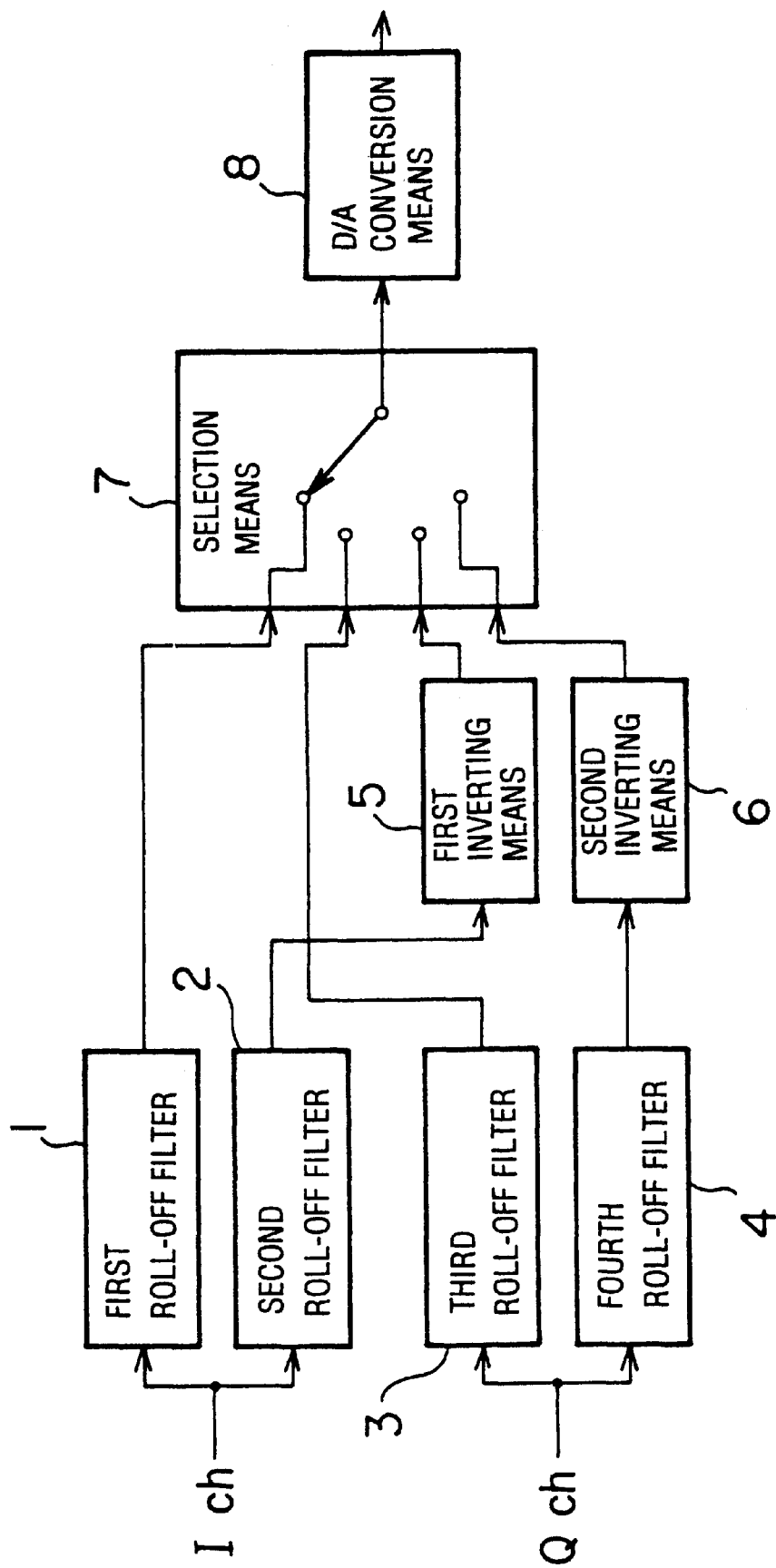
FIG. 1 is a conceptual view of the present invention.

Nine embodiments of the present invention will be described below with reference to the accompanying drawings.

At the outset, the principle of a first embodiment of the present invention will be explained with reference to FIG. 1. The first embodiment is a digital modulator, which comprises eight structural elements including: a first roll-off filter 1, a second roll-off filter 2, a third roll-off filter 3, a fourth roll-off filter 4, first inverting means 5, second inverting means 6, selection means 7, and D/A conversion means 8.

The first and a second roll-off filters 1 and 2 transmit desired frequency ranges of a return-to-zero coded I-channel baseband signal. The third and a fourth roll-off filters 3 and 4 transmit a desired frequency range of a return-to-zero coded Q-channel baseband signal. The first and second inverting means 5 and 6 invert the outputs of the second roll-off filter 2 and the fourth roll-off filter 4, respectively. Note that the above six structural elements all operate at a first predetermined clock frequency. In contrast, the selection means 7 and D/A conversion means 8 operate at a second predetermined clock frequency that is four times as high as the first predetermined clock frequency. The selection means 7 successively selects one of a first to fourth input signals, where the first to fourth input signals are the respective outputs of the first roll-off filter 1, the third roll-off filter 3, the first inverting means 5, and the second inverting means 6. The D/A conversion means 8 converts the output of the selection means 7 into an analog signal.

The present invention is based on the above-described structural arrangement, whose distinctive features include: (1) the modulator handles RZ-coded baseband signals, (2) the first to fourth roll-off filters 1–4 and the first and second inverting means 5–6 operate just at the predetermined frequency, while the selection means 7 and D/A conversion means 8 operate at a frequency of four times the predetermined frequency.

In general, baseband input signals for a digital modulator are provided in either non-return-to-zero (NRZ) code form or in return-to-zero (RZ) code form. Differences between those two codes are illustrated in a timing diagram of FIG. 2, which specifically shows bipolar signaling as used in quadrature phase shift keying (QPSK) schemes.

Figure 2:
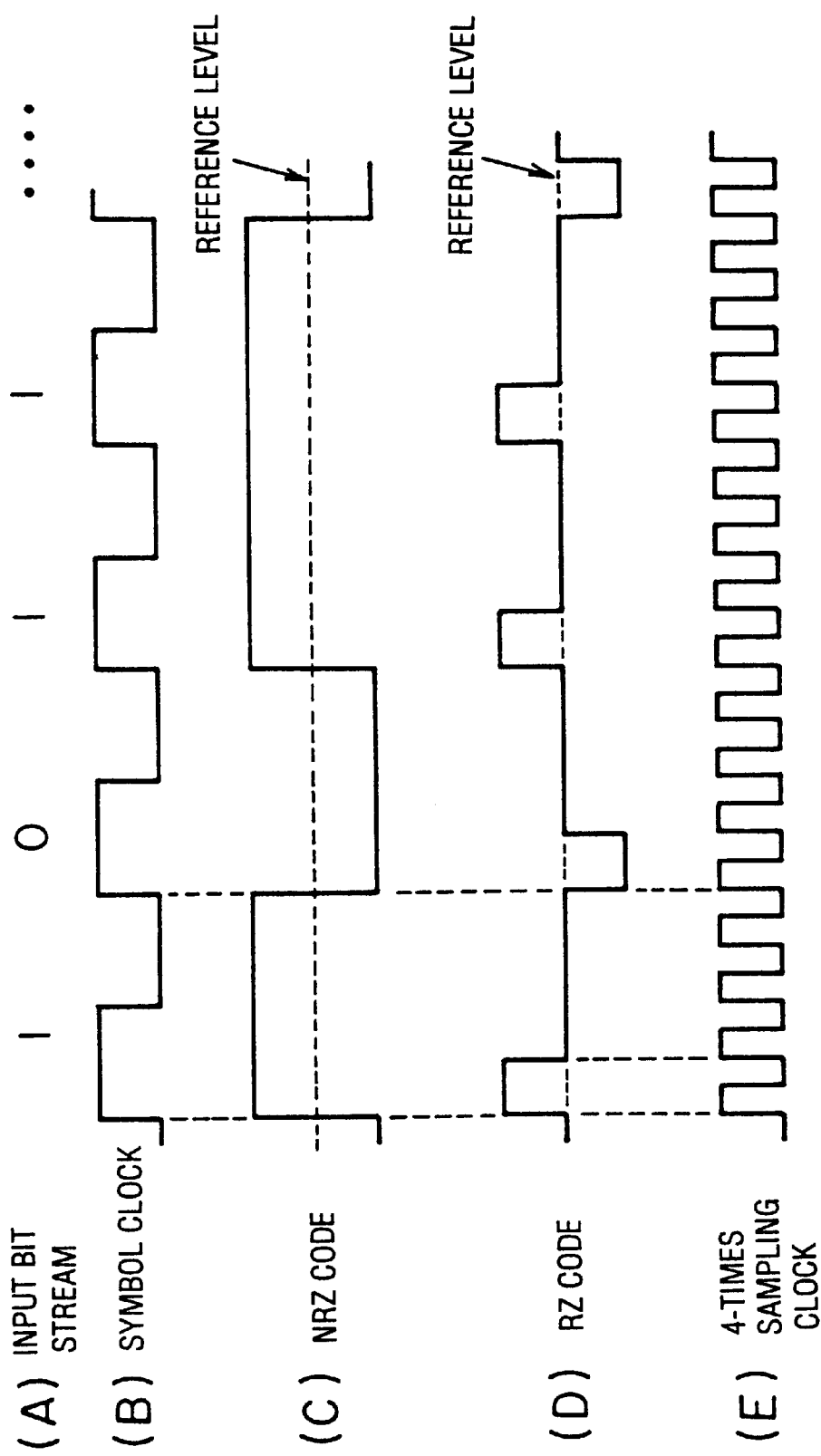
FIG. 2 is a diagram illustrating a difference between RZ code and NRZ code.

In this FIG. 2, five signals labeled as (A)–(E) are indicating the following information:
(A) an example of input bit stream,
(B) symbol clock,
(C) NRZ code corresponding to the input bit stream,
(D) RZ code corresponding to the input bit stream, and
(E) sampling clock with a frequency of four times the symbol clock.

As the signals (C) and (D) show, the NRZ code fully keeps its signal state "1" or "−1" for four sampling clock intervals for each bit, while the RZ code places a state "1" or "−1" only for the first one sampling clock period and resets it to a state "0" for the remaining three.

Utilizing this nature of the RZ code signals, the modulator of the present invention drives the roll-off filters with the symbol clock instead of the sampling clock, thereby reducing the number of multipliers contained in the first to fourth roll-off filter 1–4. Besides reducing the size of the roll-off filter circuits, the present invention enables their power consumption to be decreased, thanks to the lowered operating frequency.

Figure 3:
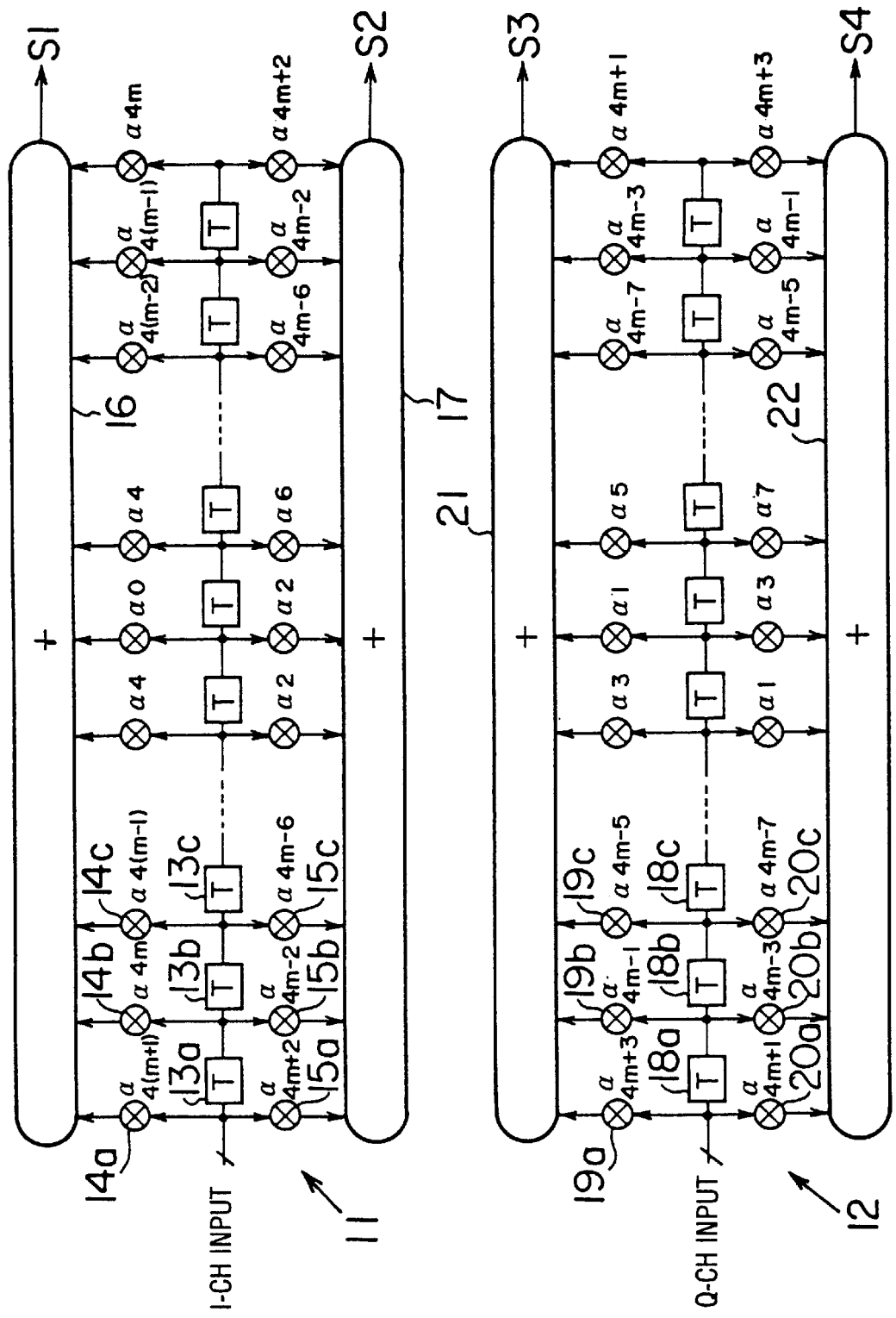
FIG. 3 is a detailed block diagram showing a first half of a first embodiment of the present invention.
Figure 4:
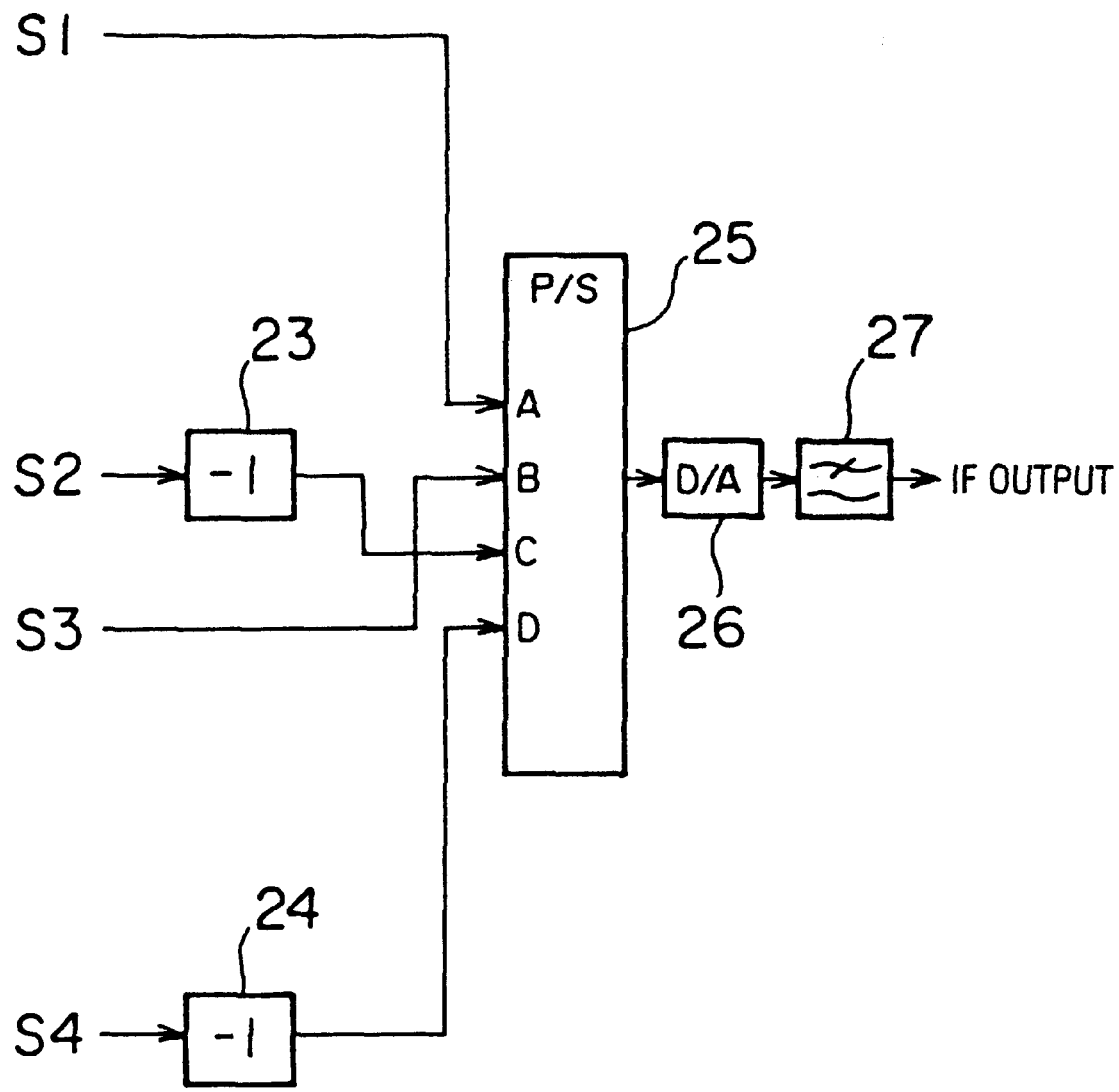
FIG. 4 is a detailed block diagram showing a second half of the first embodiment.

FIGS. 3 and 4 are detailed block diagrams showing the first and second halves of the first embodiment of the present invention explained in FIG. 1. The correspondence between the basic arrangement shown in FIG. 1 and the detailed structure shown in FIGS. 3 and 4 will be described as a separate topic, after the explanations of FIGS. 3 and 4 are finished.

To begin with FIG. 3, a roll-off filter 11 serves as two roll-off filters for an RZ-coded I-ch baseband signal, in which a single delay line composed of a plurality of flip-flops is shared by two sets of arithmetic operators to form transversal filters. Likewise, another roll-off filter 12 serves as two roll-off filters for an RZ-coded Q-ch baseband signal, being configured in the same structural arrangement as the roll-off filter 11.

In the roll-off filter 11, flip-flops 13a, 13b, 13c, and so on are connected in series to provide the entered I-ch baseband signals with successive T delays, where T is the cycle period of a carrier signal, which is equal to the symbol cycle time in this case. The delayed baseband signals are supplied to their corresponding multipliers 14a, 14b, 14c, and so on, as well as being sent to the other multipliers 15a, 15b, 15c, and so on. At every T second interval, the multipliers 14a, 14b, 14c, and so on will separately multiply the received values by their respective tap coefficients $\alpha_{4(m+1)}$, $\alpha_{4m}$, $\alpha_{4(m-1)}$, and so on, and the resultant products are then applied to an adder 16 for obtaining their summation S1 at every T interval. The multipliers 15a, 15b, 15c, and so on will also multiply the received values by their respective tap coefficients $\alpha_{4m+2}$, $\alpha_{4m-2}$, $\alpha_{4m-6}$, and so on. The resultant products are then gathered to an adder 17 for obtaining their summation S2 at every T period. FIG. 3 shows that the tap coefficients applied to the multipliers 14a, 14b, 14c, and so on are aligned in bilaterally symmetrical order, except for the leftmost coefficient $\alpha_{4(m+1)}$, with the coefficient $\alpha_0$ placed at the central tap. On the other hand, the coefficients for the multipliers 15a, 15b, 15c, and so on are also arranged symmetrically, but centered around two coefficients $\alpha_2$ and $\alpha_2$.

In the roll-off filter 12, flip-flops 18a, 18b, 18c, and so on are connected in series to provide the entered Q-ch baseband signals with successive T delays. The delayed baseband signals are then supplied to their corresponding multipliers 19a, 19b, 19c, and so on, as well as being sent to the other multipliers 20a, 20b, 20c, and so on. At every T second interval, the multipliers 19a, 19b, 19c, and so on will separately multiply the received values by their respective tap coefficients $\alpha_{4m+3}$, $\alpha_{4m-1}$, $\alpha_{4m-5}$, and so on, and applies the resultant products to an adder 21 for obtaining their summation S3 at every T period. Likewise, the multipliers 20a, 20b, 20c, and so on will multiply the received values by their respective tap coefficients $\alpha_{4m+1}$, $\alpha_{4m-3}$, $\alpha_{4m-7}$, and so on. The resultant products are then applied to an adder 22 for obtaining their summation S4 at T intervals. FIG. 3 shows that the tap coefficients for the multipliers 19a, 19b, 19c, and so on are arranged reversely to those for the other set of multipliers 20a, 20b, 20c, and so on. Further details of those roll-off filters 11 and 12 will be described later as a separate tonic.

Figure 20:
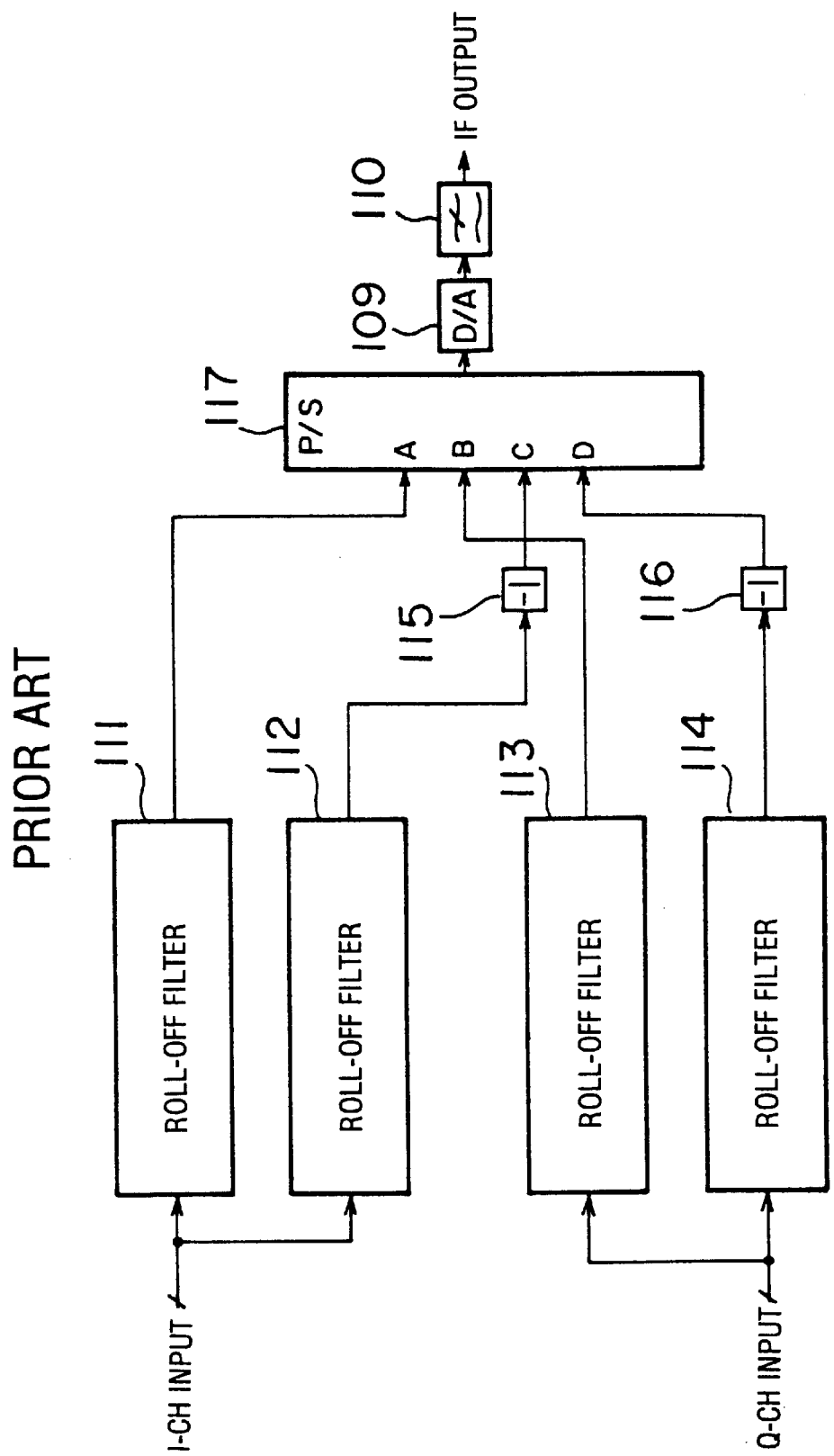
FIG. 20 is a diagram showing the structure of a conventional digital modulator where inverters and a parallel-to-serial converter are incorporated in place of multipliers and an adder.
Figure 21:
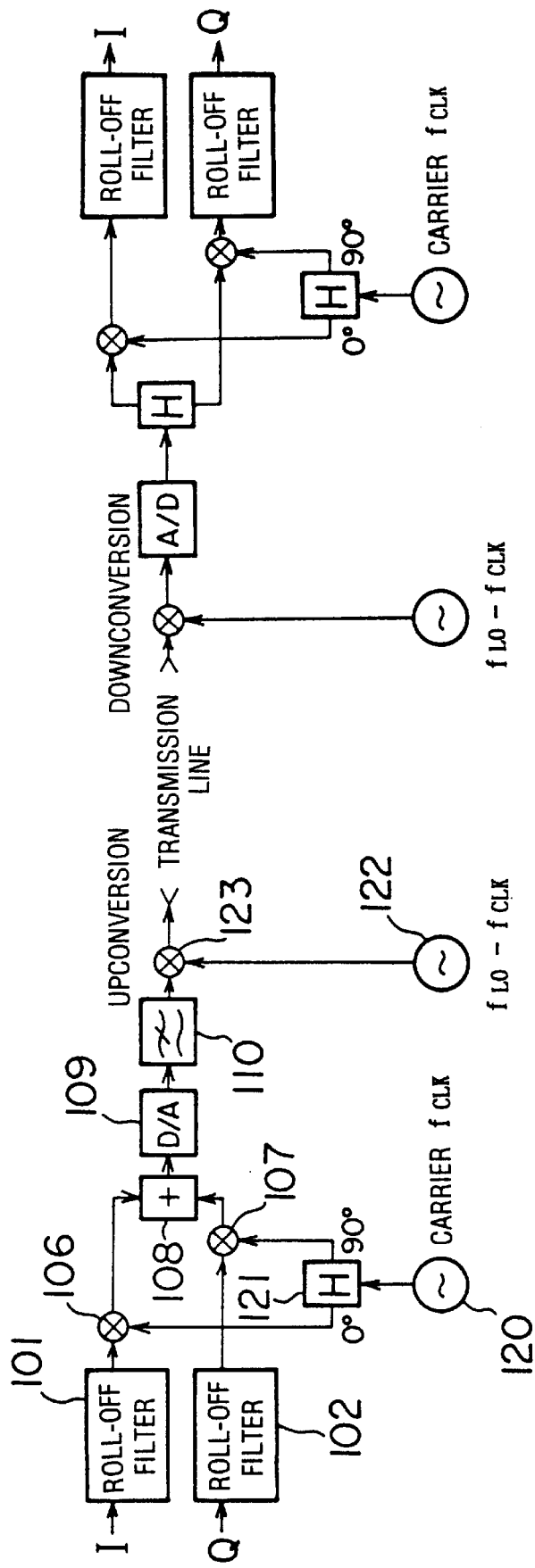
FIG. 21 is a block diagram showing a conventional digital modulator and a conventional digital demodulator.
Figures 22A, 22B:
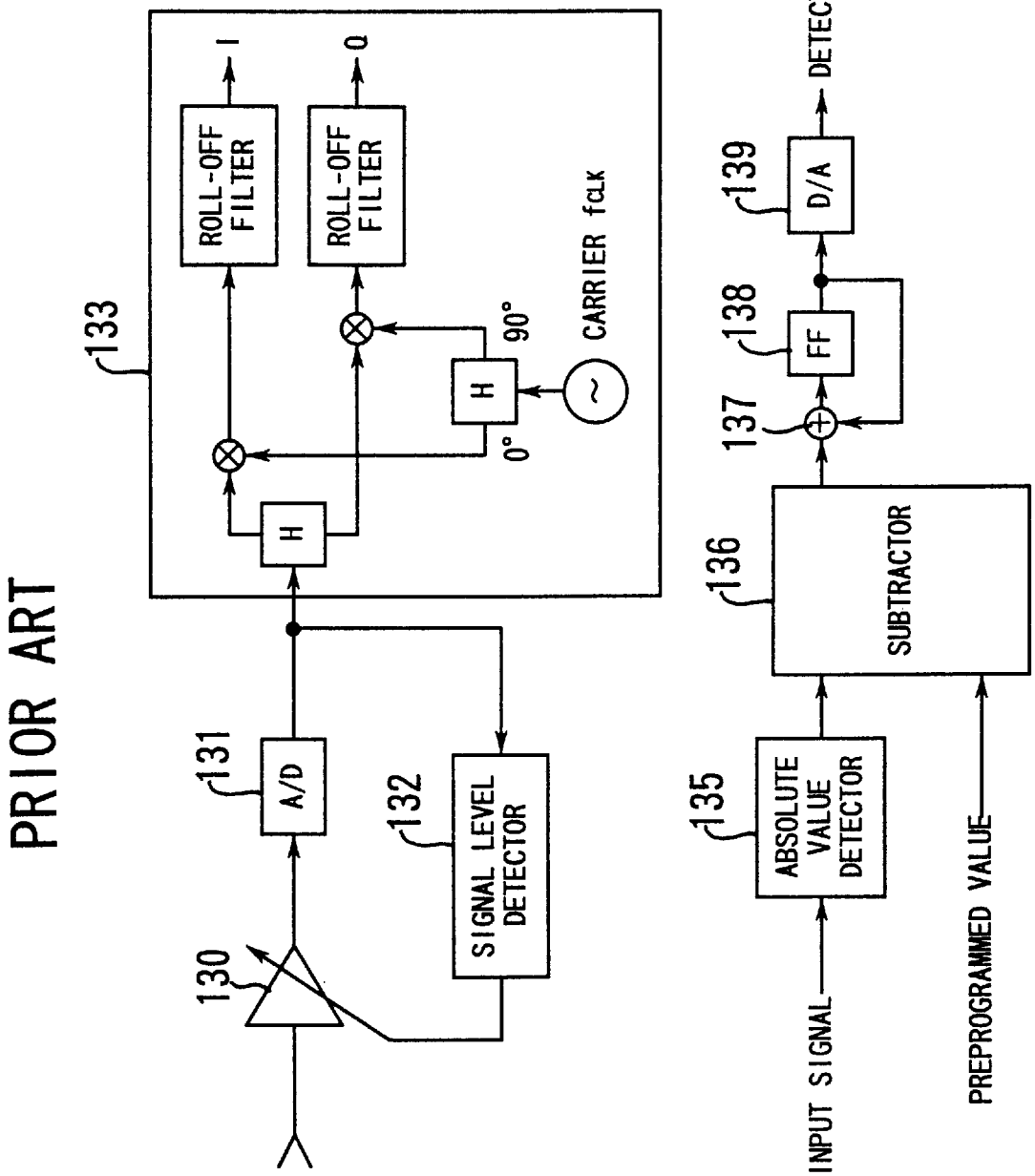
FIG. 22(A) is a block diagram showing a conventional digital demodulator.
FIG. 22(B) is a diagram showing the internal structure of a signal level detector shown in FIG. 22(A).

Referring to FIG. 4, two inverters 23 and 24 invert the summation outputs S2 and S4 from the adders 17 and 22 in FIG. 3 at the carrier intervals of T. A P/S converters 25 has four input terminals A–D to receive each roll-off filter's summation outputs. To be more specific, the inputs A and B are connected directly to the outputs of the adders 16 and 21, respectively. The inputs C and D receive inverted summation signals from the adders 17 and 22 via inverters 23 and 24, respectively. At T/4 intervals, or four times as fast as the carrier frequency, the P/S converter 25 sequentially selects one of the four input signals, from A toward D, and feeds the selected signal to a D/A converter 26. This digitally modulated signal is converted to an analog signal by the D/A converter 26 at every T/4 interval. A subsequent low-pass filter 27 will remove the alias components included in the analog signal produced through the D/A conversion process. Since the circuit shown in FIG. 4 will operate in the same way as the conventional modulator explained in FIG. 20, further description about its function is omitted.

As to the structural correspondence between the basic arrangement shown in FIG. 1 and the detailed structure shown in FIGS. 3–4 are as follows. The roll-off filter 11 in FIG. 3 corresponds to the first and second roll-off filters 1 and 2 in FIG. 1, and similarly, the roll-off filter 12 to the third and fourth roll-off filters 3 and 4. The inverters 23 and 24 in FIG. 4 are equivalent to the first and second inverting means 5 and 6 in FIG. 1, respectively. The P/S converter 25 in FIG. 4 corresponds to the selection means 7 in FIG. 1, while the D/A converter 26 corresponds to the D/A conversion means 8.

Next, the detailed operation of the roll-off filters 11 and 12 will be provided below.

Let an I-ch signal sequence be $[I_1, I_2, I_3, \ldots I_n \ldots]$, which is a sequence of RZ-coded baseband signals entered to the roll-off filter 11 at every sampling clock interval. Likewise, let the same for the Q channel be $[Q_1, Q_2, Q_3, \ldots Q_n, \ldots]$, which is supplied to the roll-off filter 12 at the same intervals. FIG. 5 shows the outputs of the I-ch roll-off filter, specifically focusing on how the convolution will progress at a near-central part of the filter, around the moment when an n-th baseband signal $I_n$ is multiplied by a tap coefficient $\alpha_0$. Similarly to the I-ch roll-off filter 11, FIG. 6 shows the outputs of the Q-ch roll-off filter 12, focusing on how the convolution will progress at a near-central part of the filter, around the moment when an n-th baseband signal $Q_n$ is multiplied by a tap coefficient $\alpha_0$. As previously explained with reference to FIG. 2, the RZ code places a state "1" or "−1" only for the first one of every four sampling clock periods and resets it to a state "0" for the remaining three. FIGS. 5 and 6 are the result of the present invention which utilizes such nature of the RZ code.

Sample outputs A, B, C, and D shown on the right-hand end of FIGS. 5 and 6 express the roll-off filter outputs at each sampling clock. The same set of indicators A–D are repeated at every four clocks, thus showing the periodicity of the roll-off filter outputs. The P/S converters 25 selects its inputs A, B, C, and then D, four times as fast as the carrier frequency. Therefore, the sample output A (FIG. 5) is supplied from the roll-off filter 11 to the input A of the parallel-to-serial converters 25, and the sample output C (FIG. 5) is simultaneously inverted and entered to the input C. Further, the sample output B (FIG. 6) is supplied from the roll-off filter 12 to the input B of the parallel-to-serial converters 25, and the sample output D (FIG. 6) is simultaneously inverted and entered to the input D.

Figure 18:
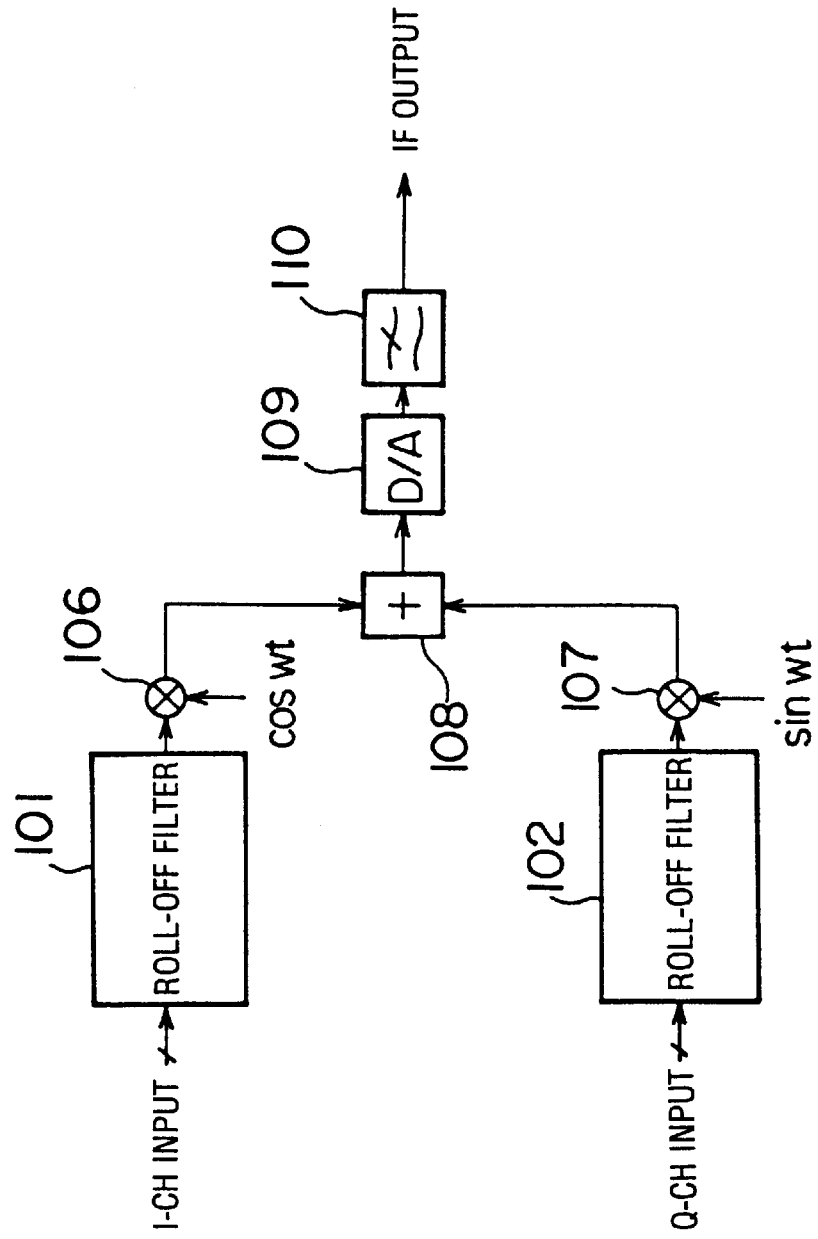
FIG. 18 is a conceptual view showing the structure of a conventional digital modulator.
Figure 19:
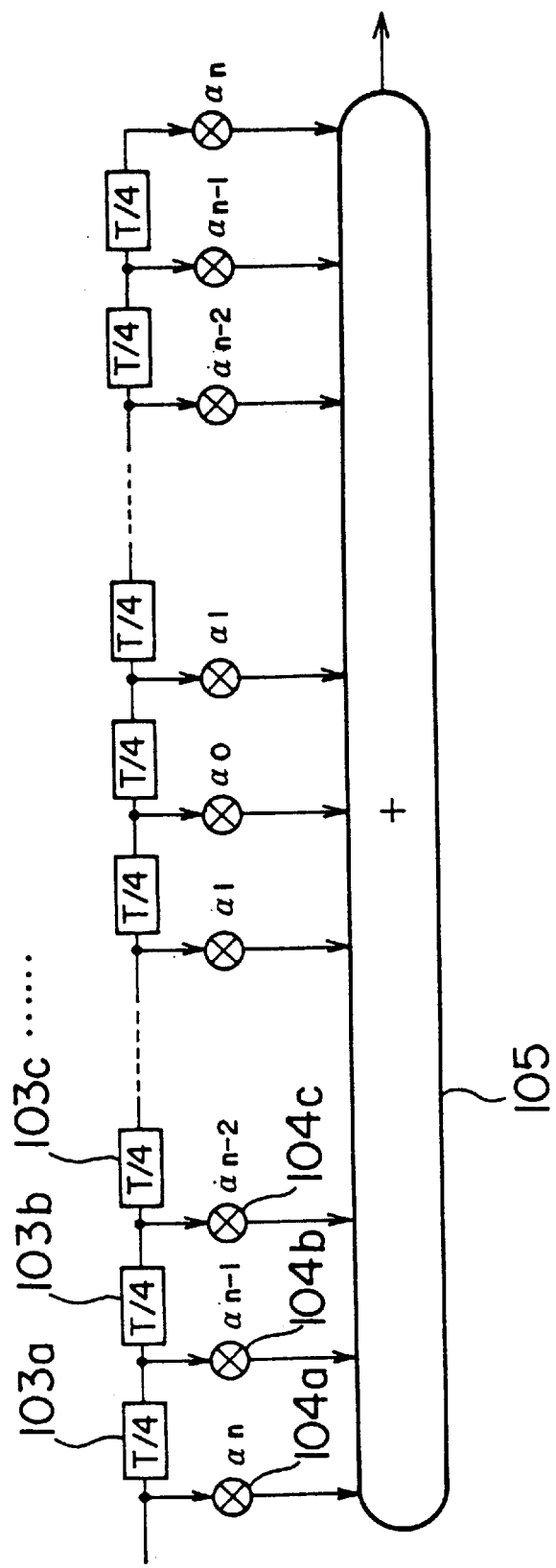
FIG. 19 is a diagram showing the internal structure of a conventional roll-off filter.

Accordingly, the sample outputs B and D shown in FIG. 5, and A and C shown in FIG. 6 can be eliminated, because they will never be selected by the parallel-to-serial converters 25. Also, the signals are outputted from the adders 16, 17, 21, and 22 of the roll-off filters 11 and 12 at the same rate as the carrier frequency. The roll-off filters in FIG. 3 originated from the total consideration on the above matters. The number of multipliers in the first embodiment is reduced to a quarter of that in the conventional modulator of FIG. 18, or to a half of that in another conventional modulator of FIG. 19. It should be also noted that the multipliers, flip-flops, and adders constituting the roll-off filters 11 and 12 all operates at the same rate as the carrier frequency.

In that way, the roll-off filter circuits in the first embodiment are reduced in size and can operate at lower frequencies, thus allowing their power consumption to be decreased. This particularly facilitates implementation of the multipliers with digital technologies, thus making it easy to integrate all the modulator circuits into a single LSI chip.

Next, a second embodiment of the present invention will be described. It is intended in the second embodiment to achieve further scale reduction of roll-off filter circuits in a digital modulator. The second embodiment, therefore, shares the fundamental structure with the first embodiment; the following description will focus on their differences.

Figure 7:
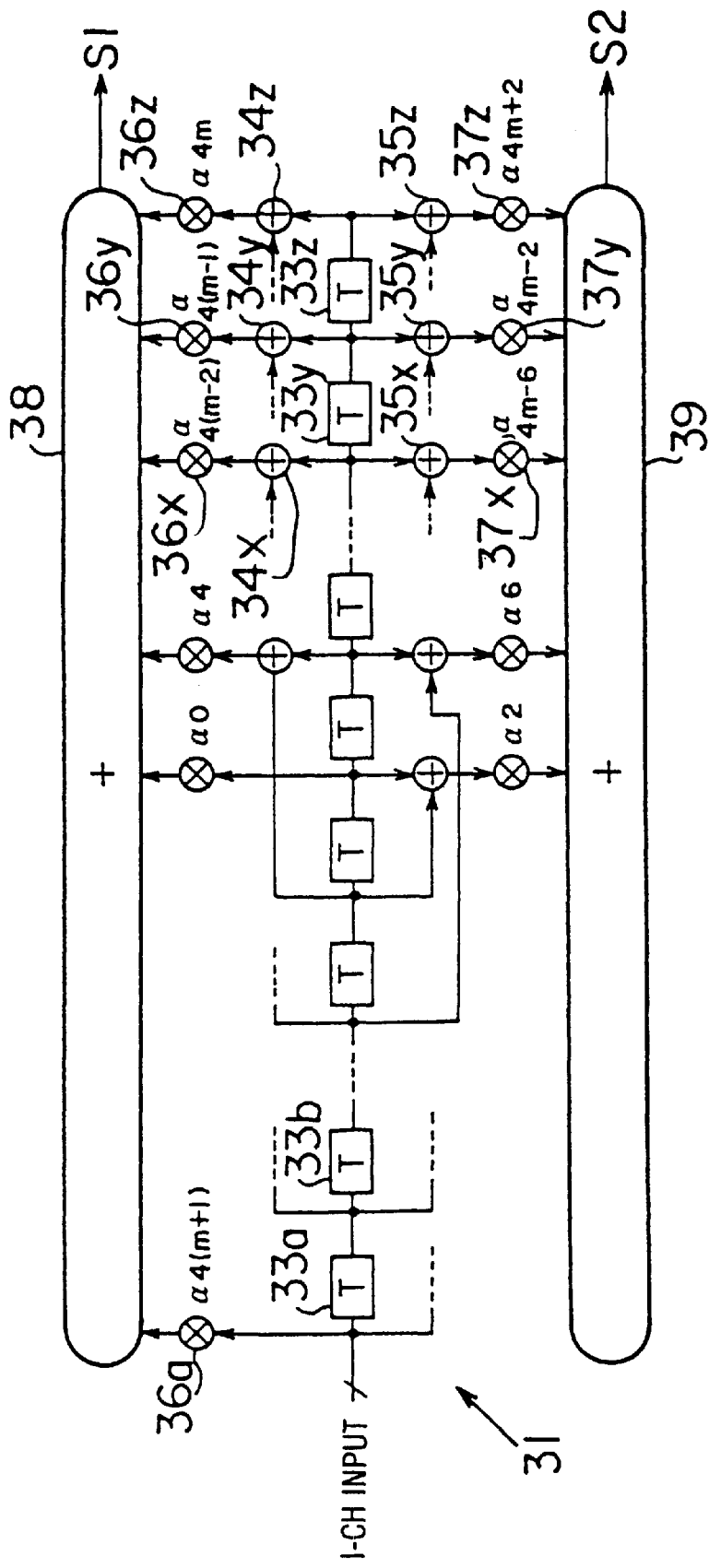
FIG. 7 is a diagram showing a roll-off filter of a second embodiment.

FIG. 7 shows a roll-off filter of the second embodiment, where a roll-off filter 31 will serve as the roll-off filter 11 in the first embodiment.

The roll-off filter 31 accepts I-ch baseband signals in RZ code form and provides two filtered outputs. It actually includes two roll-off filtering portions that share a common delay line composed of a plurality of flip-flops.

Recall that, in the roll-off filter 11 (FIG. 3) of the first embodiment, tap coefficients applied to the multipliers 14a, 14b, 14c, and so on were symmetrically arranged, except for the leftmost coefficient $\alpha_{4(m+1)}$, with the coefficient $\alpha_0$ placed at the central tap. Coefficients for the multipliers 15a, 15b, 15c, and so on were also arranged symmetrically, but centered around two coefficients $\alpha_2$ and $\alpha_2$. Considering that the size of a multiplier is one of the most dominant factors in the circuit size reduction, the second embodiment aims at a 50 percent cut in the number of multipliers. That is, the second embodiment allocates a single multiplier to two product terms having the same coefficient values.

More specifically, the roll-off filter 31 accommodates flip-flops 33a, 33b, . . . 33z connected in series to form a delay line that provides the entered baseband signal with a delay time T for each tap, where T is the interval of a carrier clock signal. The entered I-ch baseband signal is first fed forward to a multiplier 36a and an adder 35z. The first delayed signal from the flip-flop 33a is sent to adders 34z and 35y. The second delayed signal from the flip-flop 33b is sent to adders 34y and 35x. In such a manner, the further delayed signals will be distributed to their respective adders. As for the second half of the flip-flops, their outputs are fed to their respective two adders located nearby. Lastly, the delayed signal from the flip-flop 33z is sent to adders 34z and 35z. The outputs of the adders 34z, 34y, and so on are supplied to their corresponding multipliers 36z, 36y, and so on, and similarly, the outputs of the adders 35z, 35y, and so on are supplied to their corresponding multipliers 37z, 37y, 37x, and so on. The adders 34z, 34y, 34x, and so on, and 35z, 35y, 35x, and so on perform summation at every T interval. The multiplier 36a multiplies the input signal by a coefficient $\alpha_{4(m+1)}$ and sends the resultant product to an adder 38 at every T interval. The multipliers 36z, 36y, 36x, and so on multiply their respective input signals by coefficients $\alpha_{4m}$, $\alpha_{4(m-1)}$, $\alpha_{4(m-2)}$, and so on, and deliver the products to the adder 38. The adder 38 calculates the sum of those products, thus outputting the result S1 at T intervals. Also, the multipliers 37z, 37y, 37x, and so on will multiply their respective inputs by coefficients $\alpha_{4m+2}$, $\alpha_{4m-2}$, $\alpha_{4m-6}$, and so on, and send the products to the adder 39. The adder 39 calculates the sun of those multiplier outputs, thus outputting the result S2 at T intervals.

With the above-described structural arrangement, the roll-off filter 31 will offer exactly the same functions as the roll-off filter 11 in the first embodiment. It should be noted that the number of multipliers contained in the roll-off filter 31 is just a half of that in the roll-off filter 11. Although the second embodiment needs extra adders 34z, 34y, 34x, etc. and 37z, 37y, 37x, etc., the decrease of multipliers overwhelms the increase of adders from the viewpoint of circuit size reduction.

Next, a third embodiment of the present invention will be described below. Just as the second embodiment, the third embodiment also aims at further scale reduction in roll-off filter circuits for a digital modulator. The second embodiment, therefore, shares the fundamental structure with the first embodiment. The following description will then focus on their differences.

Figure 8:
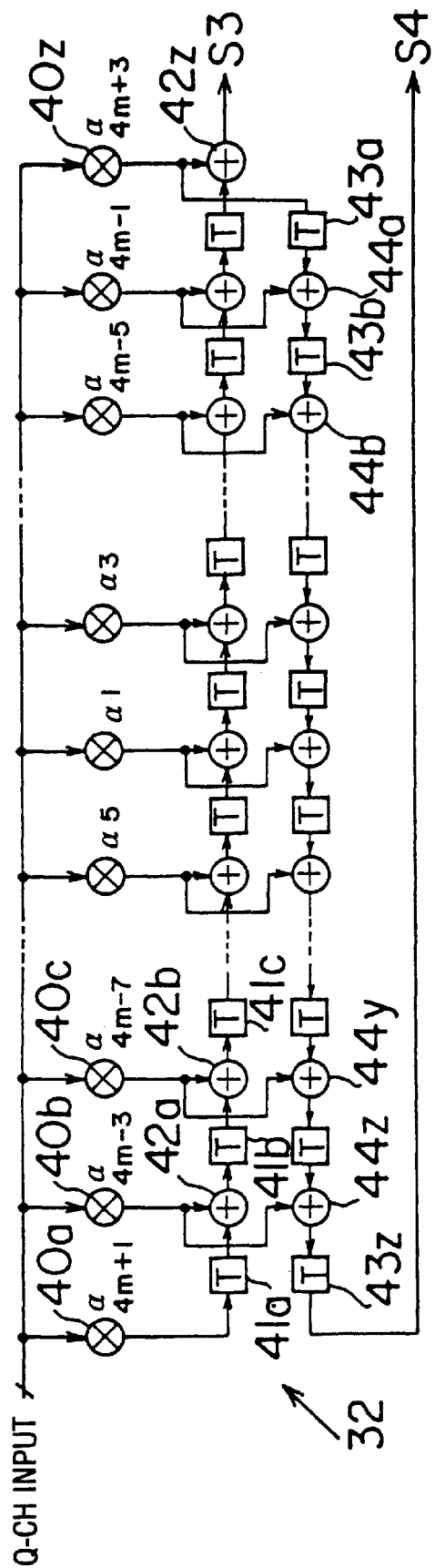
FIG. 8 is a diagram showing a roll-off filter of a third embodiment.

FIG. 8 is a diagram showing a roll-off filter of the third embodiment, in which a roll-off filter 32 works in place of the roll-off filter 12 in the first embodiment.

The roll-off filter 32 accepts RZ-coded Q-ch baseband signals and provides two filtered outputs. It actually includes two transposed-type roll-off filters, in which two delay lines run in parallel but in the opposite directions.

It should be recalled that, in the roll-off filter 12 in the first embodiment shown in FIG. 3, the tap coefficients assigned to the multipliers 19a, 19b, 19c, and so on coincide with those assigned to the multipliers 20a, 20b, 20c, and so on, if the latter are rearranged in the reverse order. Based on this nature of tap coefficient arrangement, the third embodiment configures its Q-ch roll-off filter so that each single multiplier be shared by two product terms having the same tap coefficient value, aiming at a 50 percent reduction of multipliers.

To describe it more specifically, the roll-off filter 32 sends a Q-ch baseband signal to a plurality of multipliers 40a, 40b, 40c, . . . 40z to multiply the same signal by their respective tap coefficients $\alpha_{4m+1}$, $\alpha_{4m-3}$, $\alpha_{4m-7}$, . . . $\alpha_{4m+3}$ at a time. This multiplication is performed at every carrier interval T, which agrees with the symbol interval in the present embodiment.

The leftmost multiplier 40a sends its resultant product to a flip-flop 41a, and the remaining multipliers 40b, 40c, . . . 40z supply their results to corresponding adders 42a, 42b, . . . 42z as well as feeding them to another series of adders 44Z, 44y, . . . 44a, respectively. The adder 42a applies its summation output to the flip-flop 41b, and the flip-flop 41b sends its output to the next adder 42b. The adder 42b delivers its output to the next flip-flop 41c, . . . and so on. At the end of this data path, the adder 42z outputs the signal S3 to the input B of the P/S converters 25. The flip-flops 41a, 41b, . . . 41z delay their respective input signals by a constant delay time equal to the carrier interval T. Note that all the circuit elements mentioned above operate at the same T intervals.

Meanwhile, the rightmost multiplier 40z sends its output also to a flip-flop 43a. The flip-flop 43a applies its output to the adder 44a, and the adder 44a directs its summation output to the next flip-flop 43b, and the flip-flop 43b sends its output to the next adder 44b. At the end of this data path, the last flip-flop 43z outputs the signal S4 to the input D of the P/S converters 25 via the inverter 24. The flip-flops 43a, 43b, . . . 43z provides their respective input signals with a constant delay time T. Note-that all the adders and multipliers mentioned above operate at the same T intervals.

Being configured in the above-described structural arrangement, the roll-off filter 32 will function exactly in the same way as the roll-off filter 12 did in the first embodiment. It should be noted that the number of multipliers contained in the roll-off filter 32 is just a half of that in the roll-off filter 12. Although the third embodiment needs extra adders 42a, 42b, . . . 42z and 44a, 44b, . . . 44z, the decrease of multipliers overwhelms the increase of adders from the viewpoint of circuit size reduction.

For more improvement, it is possible to adopt both the first and second embodiments at a time. This combination will maximize the effect of circuit reduction in roll-off filters.

Next, a fourth embodiment of the present invention will described below, which will allow the carrier frequency to be doubled.

Figure 9:
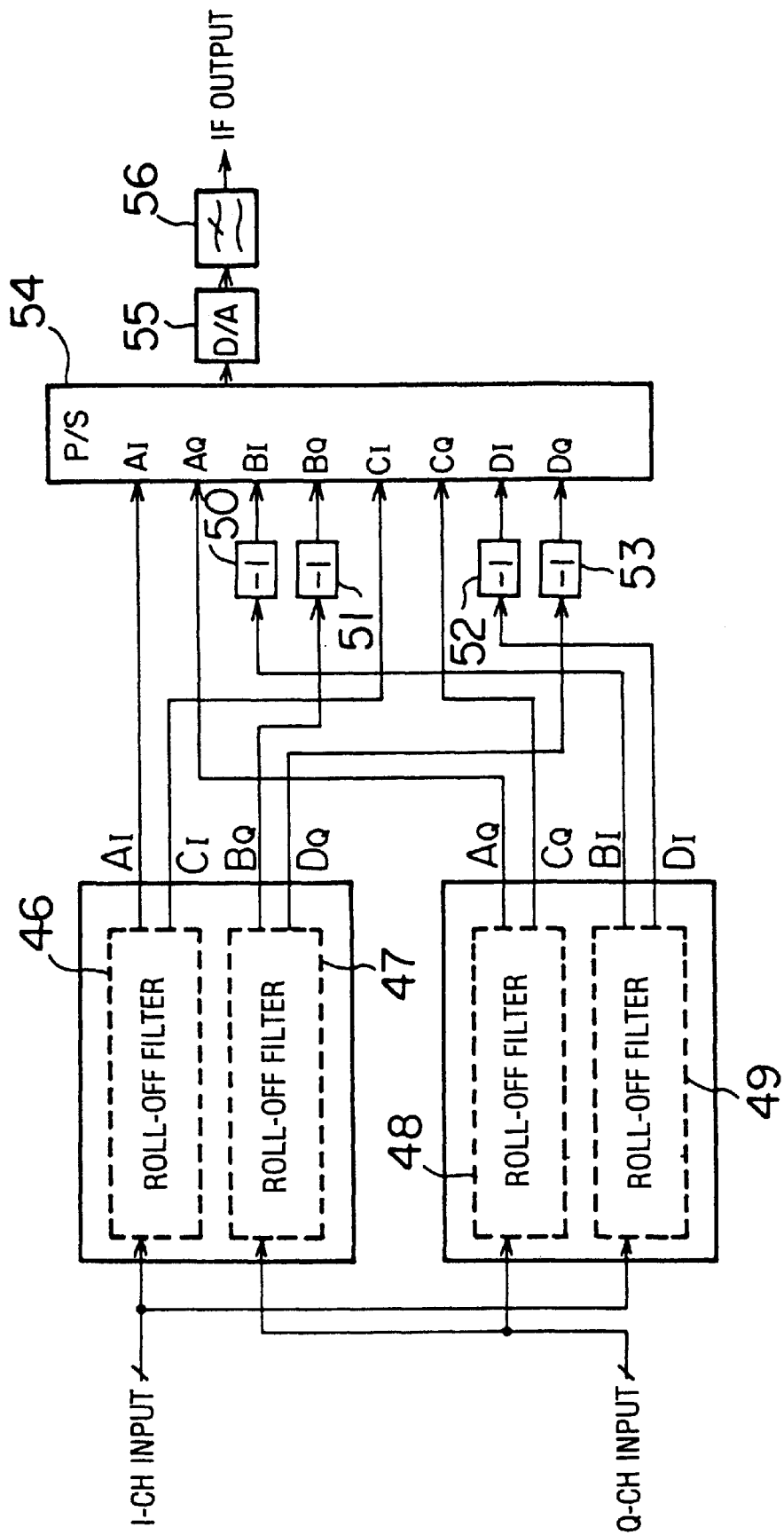
FIG. 9 is a diagram showing the structure of a digital modulator of a fourth embodiment.

FIG. 9 is a diagram showing the structure of a digital modulator in the fourth embodiment. In FIG. 9, RZ-coded I-ch baseband signals are supplied to two roll-off filters 46 and 49, and RZ-coded Q-ch baseband signals to two roll-off filters 47 and 48. The roll-off filters 46 and 48 have the same internal structure as that of the roll-off filter 11 of the first embodiment shown in FIG. 3, or the roll-off filter 31 of the second embodiment shown in FIG. 7. The roll-off filters 47 and 49 are configured in the same internal structure as the roll-off filter 12 of the first embodiment shown in FIG. 3, or the roll-off filter 32 of the third embodiment shown in FIG. 8. All those roll-off filters 46–49 operate at the same rate as the carrier frequency, which is equal to the symbol rate in this case. Output signals of those roll-off filters are named as follows: $A_I$ and $C_I$ for the roll-off filter 46, $B_Q$ and $D_Q$ for the roll-off filter 47, $A_Q$ and $C_Q$ for the roll-off filter 48, and $B_I$ and $D_I$ for the roll-off filter 49.

An inverter 50 inverts the signal $B_I$ from the roll-off filter 49 at T intervals. Likewise, an inverter 51 inverts the signal $B_Q$ from the roll-off filter 47, an inverter 52 inverts the signal $D_I$ from the roll-off filter 49, and an inverter 53 inverts the signal $D_Q$ from the roll-off filter 47 at every T interval.

A P/S converters 54 has eight input terminals $A_I$, $A_Q$, $B_I$, $B_Q$, $C_I$, $C_Q$, $D_I$ and $D_Q$, corresponding to the roll-off filter outputs named as above. The input terminals $A_I$ and $C_I$ receive the signals $A_I$ and $C_I$ directly from the roll-off filter 46. The input terminals $A_Q$ and $C_Q$ receive the signals $A_Q$ and $C_Q$ directly from the roll-off filter 48. The input terminals $B_I$ and $D_I$ receive inverted signals $-B_I$ and $-D_I$ originating from the roll-off filter 49 via the inverters 50 and 52, respectively. The input terminals $B_Q$ and $D_Q$ receive inverted signals $-B_Q$ and $-D_Q$ originating from the roll-off filter 47 via the inverters 51 and 53, respectively.

At intervals of T/8 (or at a rate eight times as high as the carrier frequency), the P/S converter 54 successively selects one of the eight inputs $A_I$, $A_Q$, $B_I$, $B_Q$, $C_I$, $C_Q$, $D_I$ and $D_Q$ in this order, and sends it to a D/A converter 55. The signal now provided to the D/A converter 55 is a modulated signal, although it still is a sequence of digital data. At T/8 intervals, the D/A converter 55 converts it to an analog signal, and a low-pass filter 56 rejects the alias frequency components imposed in the spectrum of the resultant analog signal.

Next, the operation of the above fourth embodiment will be described with reference to FIG. 10.

FIG. 10 is a table that explains how the fourth embodiment, which allows the carrier frequency to be twice the symbol rate. The table contains PART-1 and PART-2. The PART-1 shows, only for comparison, such a case that the carrier frequency is equal to the symbol rate as is in the first to third embodiments.

The PART-2 of FIG. 10 shows a case when the carrier frequency is twice as high as the symbol rate. That is, the carrier wave signals, cos ωt and sin ωt, will change, in synchronization with each sampling clock, in the following sequence within one symbol interval, $$\cos \omega t = [1, 0, -1, 0, 1, 0, -1, 0] \quad (3a)$$

$$\sin \omega t = [0, 1, 0, -1, 0, 1, 0, -1] \quad (3b)$$

Therefore, the digitally modulated signal will appear as:

$$[A_I, A_Q, -B_Q, C_I, C_Q, -D_I, -D_Q] \quad (3c)$$

The circuit in FIG. 9 is configured so that the P/S converters 54 will output the modulated signal according to the sequence (3c).

In the fourth embodiment, the modulator with a doubled carrier frequency can be obtained simply by combining the roll-off filters used in the first to third embodiments with some appropriate interconnection. Specifically, signals can be processed eight times as fast as the carrier frequency, by using relatively slow roll-off filters operating at the original carrier frequency. This feature allows the roll-off filters to stay at the same scale, even when a higher ratio of carrier frequency to symbol rate is required.

The following description will be devoted to a digital modulator of a fifth embodiment, in which the carrier frequency is four times the symbol rate.

Figure 11:
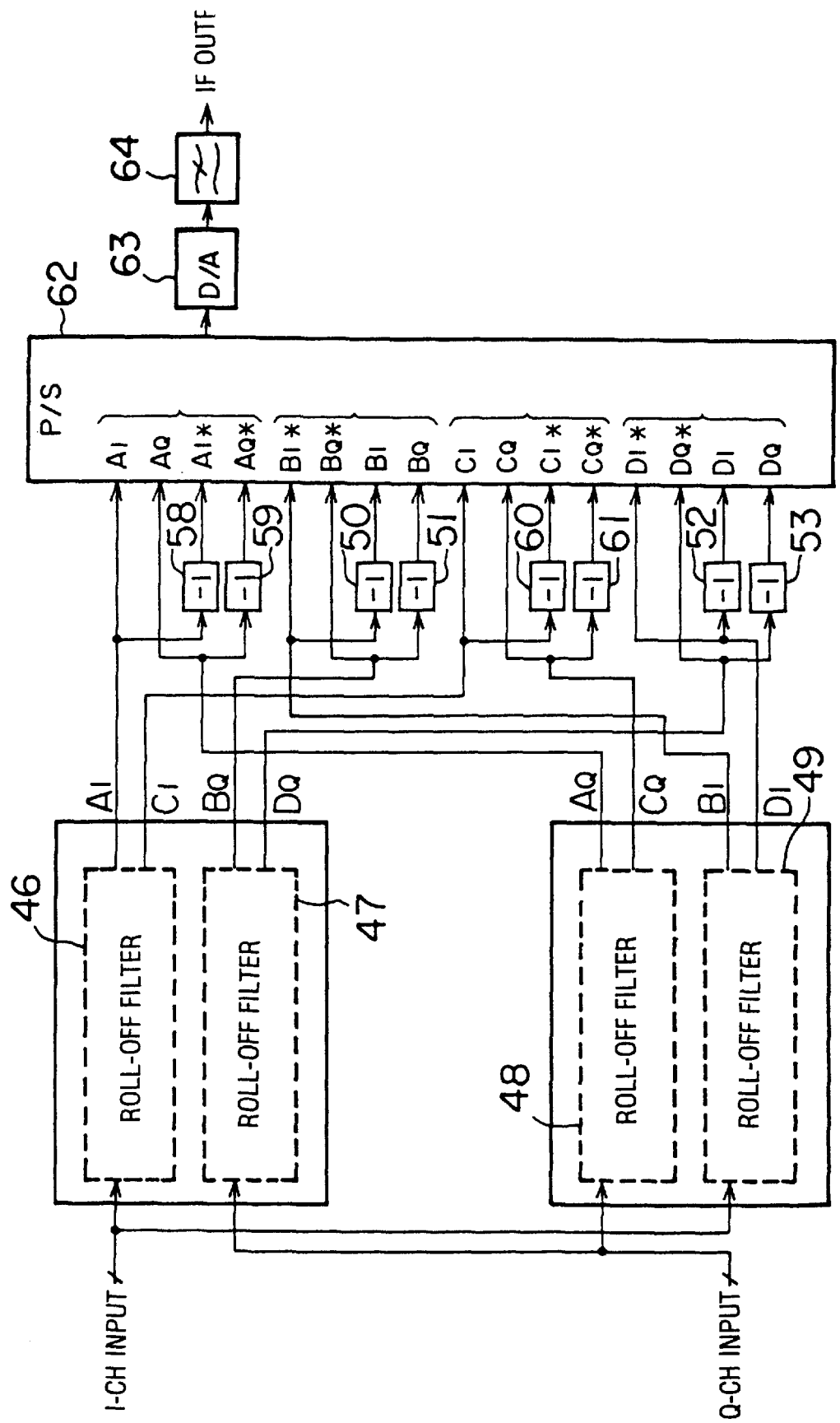
FIG. 11 is a block diagram showing a digital modulator of a fifth embodiment.

FIG. 11 is a block diagram showing a digital modulator of the fifth embodiment. Since this fifth embodiment has basically the same structure as that of the fourth embodiment, the following description will focus on its distinctive points, maintaining consistent reference numerals for the common elements.

The digital modulator in the fifth embodiment is equipped with additional four inverters 58–61. The inverter 58 inverts the signal Ar from the roll-off filter at T intervals. Likewise, the inverter 59 inverts the signal $A_Q$ from the roll-off filter 48, the inverter 60 inverts the signal $C_I$ from the roll-off filter 46, and the inverter 61 inverts the signal $C_Q$ from the roll-off filter 48 at every T interval.

A P/S converters 62 has sixteen input terminals $A_I$, $A_Q$, $A_{I^*}$, $A_{Q^*}$, $B_I$, $B_Q$, $B_{I^*}$, $B_{Q^*}$, $C_I$, $C_Q$, $C_{I^*}$, $C_{Q^*}$, $D_I$, $D_Q$, $D_{I^*}$, and $D_{Q^*}$. The input terminals $A_I$ and $C_I$ receive the signals $A_Q$ and $C_I$ directly from the roll-off filter 46. The input terminals $B_{Q^*}$ and $D_{Q^*}$ receive the signals $B_Q$ and $D_Q$ directly from the roll-off filter 47. The input terminals $A_Q$ and $C_Q$ receive the signals $A_Q$ and $C_Q$ directly from the roll-off filter 48. The input terminals $B_{I^*}$ and $D_{I^*}$ receive the signals $B_I$ and $D_I$ directly from the roll-off filter 49. On the other hand, the input terminals $A_{I^*}$ and $C_{I^*}$ receive inverted signals $-A_I$ and $-C_I$ originating from the roll-off filter 46 via the inverters 58 and 60, respectively. The input terminals $B_Q$ and $D_Q$ receive inverted signals $-B_Q$ and $-D_Q$ originating from the roll-off filter 47 via the inverters 51 and 53, respectively. The input terminals $A_{Q^*}$ and $C_{Q^*}$ receive inverted signals $-A_Q$ and $-C_Q$ originating from the roll-off filter 48 via the inverters 59 and 61, respectively. The input terminals $B_I$ and $D_I$ receive inverted signals $-B_I$ and $-D_I$ originating from the roll-off filter 49 via the inverters 50 and 52, respectively.

At intervals of T/16 (or sixteen times as fast as the carrier frequency), the P/S converter 62 successively selects one of the sixteen inputs $A_I$, $A_Q$, $A_{I^*}$, $A_{Q^*}$, $B_I$, $B_Q$, $B_{I^*}$, $B_{Q^*}$, $C_I$, $C_Q$, $C_{I^*}$, $C_{Q^*}$, $D_I$, $D_Q$, $D_{I^*}$, and $D_{Q^*}$ in this order, and sends it to a D/A converter 63. The signal now provided to the D/A converter 63 is a digitally modulated signal. At T/16 intervals, the D/A converter 63 converts it to an analog signal, and a low-pass filter 64 removes alias frequency components imposed in the spectrum of the resultant analog signal.

In the fifth embodiment, a digital modulator that operate with four times the carrier frequency can be realized simply by combining the roll-off filters defined in the first to third embodiments along with some appropriate interconnection. In other words, the signals can be processed at T/16 intervals by using relatively slow roll-off filters operating at T intervals.

That concept can be extended to n times higher ratios of carrier frequency to symbol rate, where n is a power of two. That is, the modulator will process the signals n times as fast as the carrier frequency, while using ordinary roll-off filters operating at the carrier frequency and the P/S converter 62 and D/A converter 63 working at n times higher frequency.

The following will present a sixth embodiment, which allows the carrier frequency to be set to n times the symbol rate.

Figure 12:
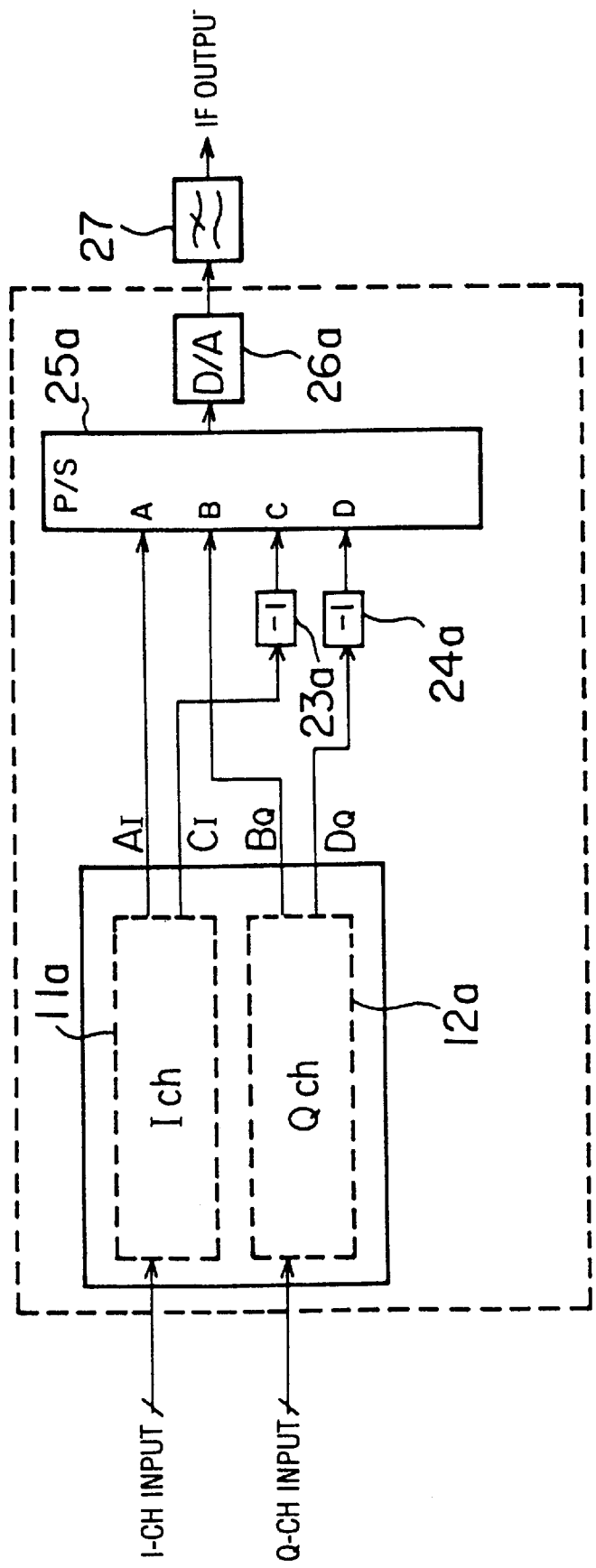
FIG. 12 is a block diagram showing a digital modulator of a sixth embodiment.

FIG. 12 shows a digital modulator of the sixth embodiment, which is furnished with roll-off filters 11a and 12a, inverters 23a and 24a, a P/S converter 25a, and a D/A converter 26a each providing basically the same functions as those brought by the roll-off filters 11 and 12, inverters 23 and 24, P/S converters 25, and D/A converter 26 in the first embodiment. Those elements in this modulator, however, operate at a rate of n times the symbol rate, and therefore, the tap coefficients in the roll-off filters 11a and 12a should be programmed for n-times sampling, instead of 4-times sampling. The low-pass filter 27 is the same as that seen in the first embodiment.

The sixth embodiment, in an attempt to raise the carrier frequency to n times the symbol rate, requires faster operation of the roll-off filters and other elements, while the circuit size does not increase. In addition, it virtually reduces the number of taps in the roll-off filters.

Next, a seventh embodiment will be described with reference to FIG. 13, where a set of digital modulator and demodulator is shown.

Figure 13:
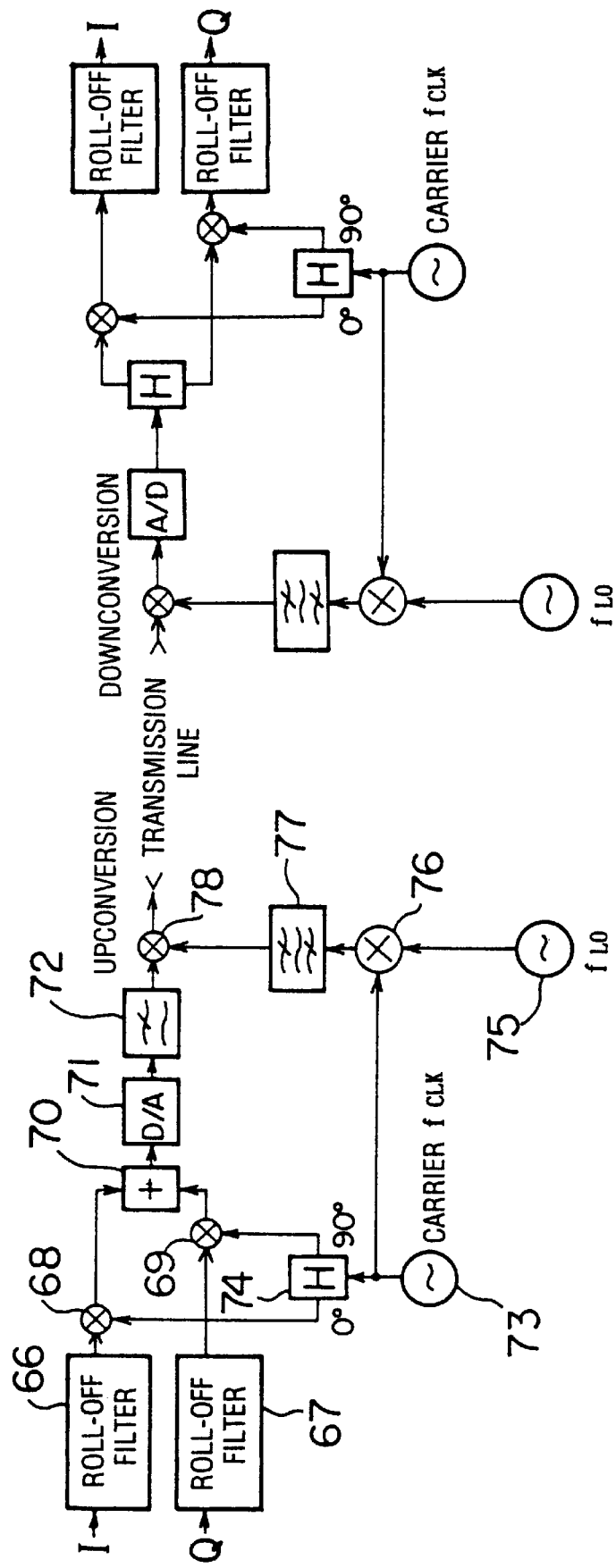
FIG. 13 is a block diagram showing a digital modulator and a digital demodulator of a seventh embodiment.

In FIG. 13, a digital modulator is organized by two roll-off filters 66 and 67, two multipliers 68 and 69, an adder 70, a D/A converter 71, and a low-pass filter 72. Further, the digital modulator comprises a carrier oscillator 73 to generate a carrier signal with a frequency $f_{CLK}$ that is determined from the symbol rate. A splitter 74 splits the carrier signal into two ways and delivers one to the multiplier 68, as well as supplying the other to the multiplier 69 with a phase shift of 90 degrees. Another oscillator 75 generates a radio frequency $f_{LO}$. The carrier frequency $f_{CLK}$ and the radio frequency $f_{LO}$ are mixed by a mixer circuit 76, thus causing two separate frequencies, the sum $f_{LO}+f_{CLK}$ and the difference $f_{LO}-f_{CLK}$, to be sent to a band-pass filter 77. The band-pass filter 77 extracts only the difference frequency signal $f_{LO}-f_{CLK}$ and feeds it to a frequency converter 78. In addition to this difference frequency signal, the frequency converter 78 also receives a modulated signal from the low-pass filter 72. While the frequency content of this modulated signal is centered around the carrier frequency $f_{CLK}$, the frequency converter 78 will raise it to the radio frequency $f_{LO}$ by applying the difference frequency signal $f_{LO}-f_{CLK}$ thereto. The produced modulated radio signal, whose spectral density is distributed around the radio frequency $f_{LO}$, is then sent out to a transmission line.

Although this description will not provide the details, a digital demodulator shown in the right half of FIG. 13 reproduces the I-ch and Q-ch signals from the received modulated radio signal through a demodulation process that exactly reverses the modulation process.

Because the oscillator 75 only generates the radio frequency $f_{LO}$ independently of the carrier frequency $f_{CLK}$, the modulator is free from such a past problem that the radio frequency oscillator has to be modified when it is required to change the carrier frequency $f_{CLK}$. This feature is also true on the demodulator side.

The following description will now present an eighth embodiment relating to a digital demodulator.

Figures 14A, 14B:
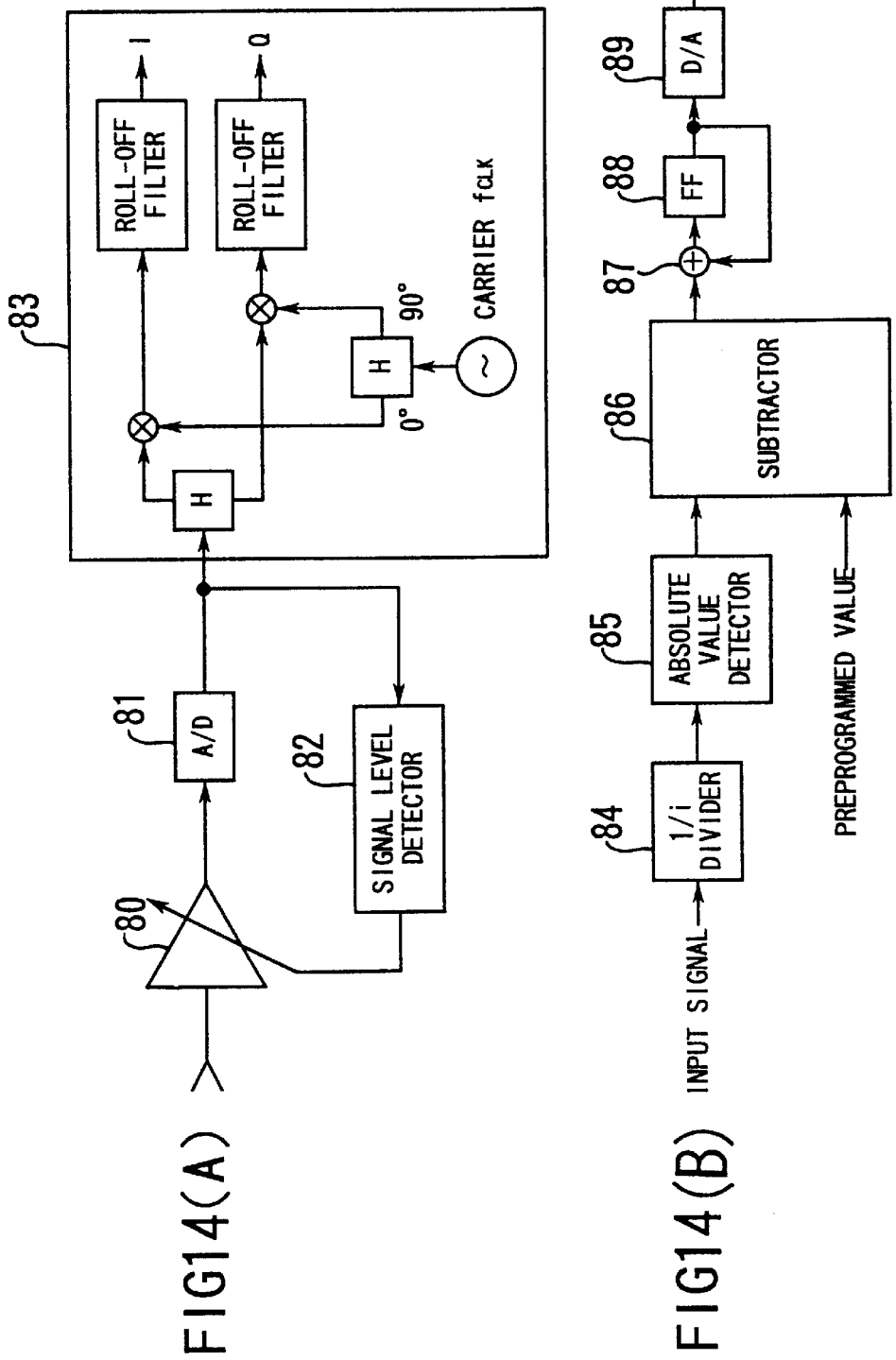
FIG. 14(A) is a block diagram showing a digital demodulator of an eighth embodiment.
FIG. 14(B) is a block diagram showing the internal structure of a signal level detector shown in FIG. 14(A)

FIG. 14(A) is a block diagram of a digital demodulator according to the eighth embodiment. FIG. 14(B) further provides the internal structure of a signal level detector 82 seen in FIG. 14(A).

In a digital demodulator in FIG. 14(A), the modulated reception signals are first entered to an automatic gain control (AGC) circuit 80 to obtain a constant signal level by regulating it according to a control signal from a signal level detector 82, which is described later. An analog-to-digital (A/D) converter 81 disposed next to the AGC circuit 80 converts the analog reception signals to a series of digital data to be processed by a demodulator 83. The signal level detector 82 receives the digital reception signal from the A/D converter 81 and detects its signal level. If the detected level has some error from a predetermined value, the signal level detector 82 sends control signals to the AGC circuit 80, prompting it to adjust its gain to keep a constant reception signal level.

Here, the digital reception signals has a carrier frequency component that is equal to n×4 times the symbol rate. On the other hand, a different operating frequency, (n×4)/i time the symbol rate, is used at the signal level detector 82, where the divisor i is an integer that is prime to (n×4). For example, the divisor i may be set to 5, when (n×4)=4. By dividing the original sampling rate by the integer i, the signal level detector 82 operates at a lower frequency, thus contributing to the cost reduction of demodulator. Further, since the divisor i is prime to (n×4), the signal level detector 82 will never be captured by the symbol clock, thus preventing the detection samples from being biased to some particular phases of the modulated reception signals. Some examples will be presented later.

The signal level detector 82 has an i:1 divider 84, as shown in FIG. 14(B), for dividing the operating clock down to 1/i of its original rate, and according to this reduced clock, an absolute value detector 85 detects the absolute value of the input signal. A subtractor 86 calculates difference between the detected absolute value and a preprogrammed value, and sends the difference to an integrator composed of an adder 87 and a flip-flop 88 for integration with respect to time. A D/A converter 89 translates the result of the integration to an analog control signal for use in the AGC circuit 80.

Figure 15:
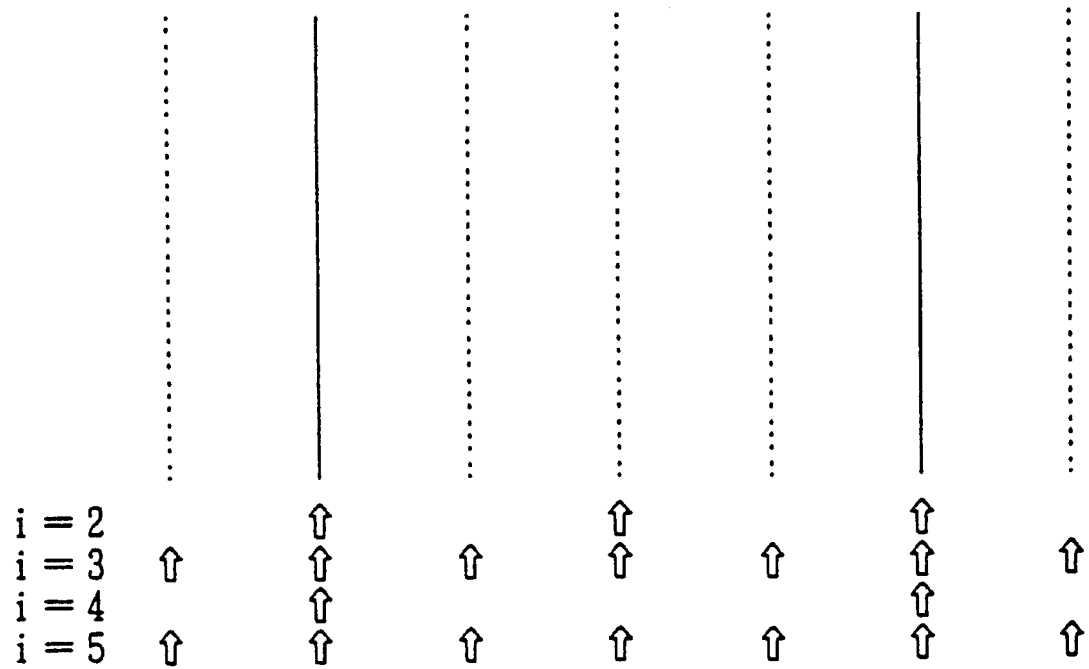
FIG. 15 is a diagram showing some different sampling timings determined by various values of i in the signal level detection.

FIG. 15 shows sampling timings of the signal level detector 82 when the divisor i is varied. Doted lines and solid lines in FIG. 15 indicates each signal transition timing, and upward arrows on the bottom show the sampling operations by the signal level detector 82. It is assumed here that the multiplication factor (n×4) is set to 4, as the solid lines imply. For i=2 or i=4, the signal level detector 82 becomes unable to get samples at some particular timings even if it repeated the sampling operations many times. In contrast, i=3 and i=5 can cover all possible transitions of the signal.

Lastly, a ninth embodiment relating to a digital modulator will be described below.

Figure 16:
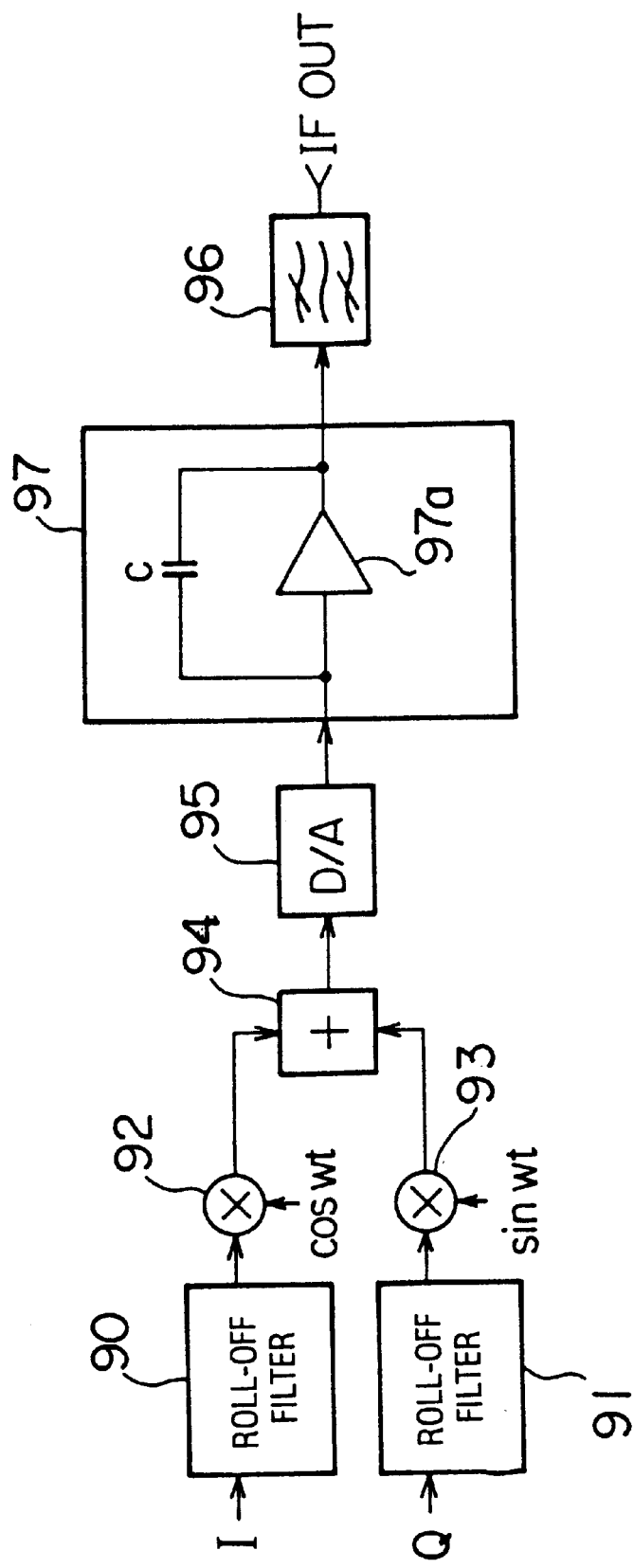
FIG. 16 is a block diagram showing a digital modulator of a ninth embodiment.

FIG. 16 is a block diagram showing a digital modulator of the ninth embodiment. The modulator is basically organized by two roll-off filters 90 and 91, two multipliers 92 and 93, an adder 94, a D/A converter 95, and a low-pass filter 96. The modulator further comprises an equalizer 97 next to the D/A converter 95 to compensate, in an analog fashion, for the first-order attenuation caused by the D/A conversion. The equalizer 97 consists of, for example, an amplifier 97a and a capacitor C for positive feedback. The positive feedback boosts higher frequencies in the output signal of the D/A converter 95. The same effect may be obtained by configuring the equalizer 97 with a negative feedback path including an inductor.

The ninth embodiment thus improves the frequency response of the modulator by compensating the output of the D/A converter 95, thus permitting the modulated signal to have a flat frequency characteristic.

Figure 17:
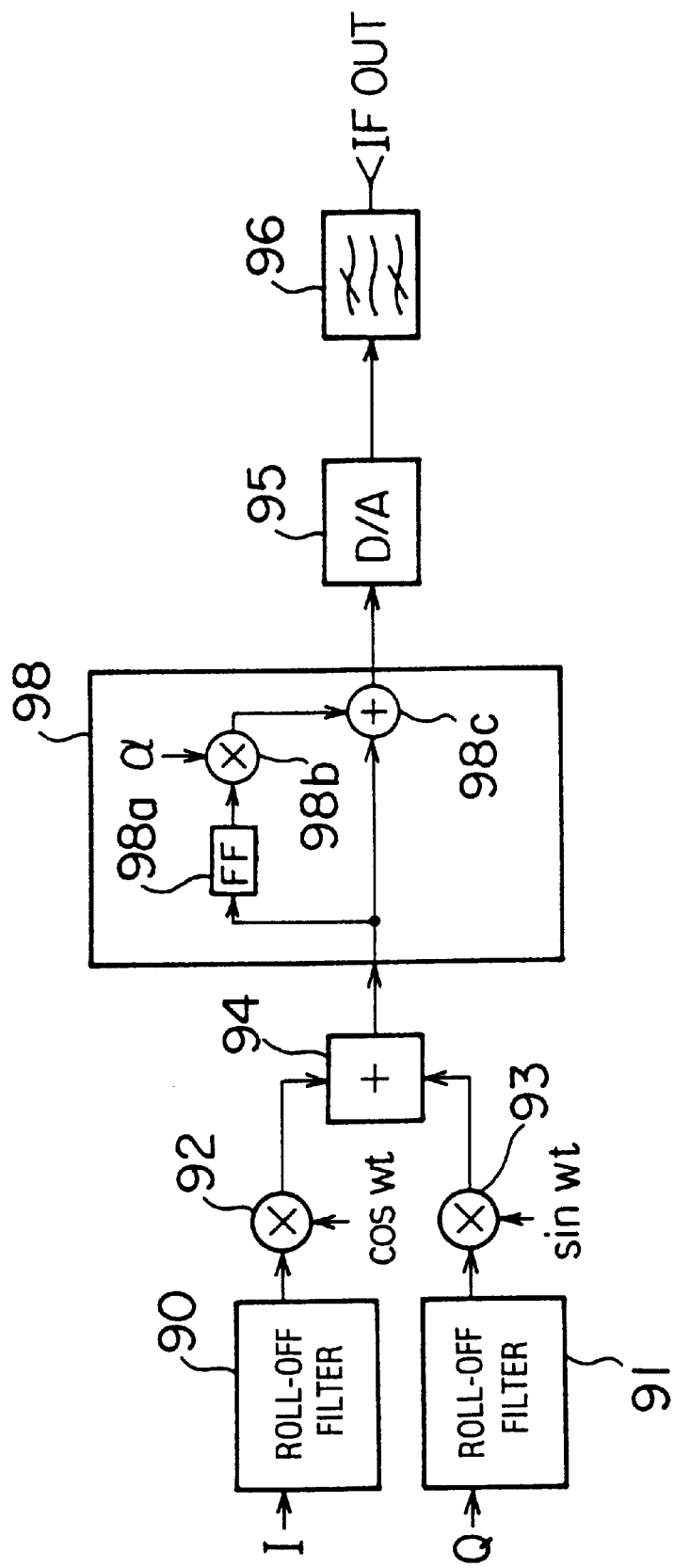
FIG. 17 is a block diagram showing another structure of a digital modulator as an alternative of that shown in FIG. 16.

FIG. 17 presents an alternative configuration for the equalizer 98, in which configuration the compensation is carried out in a digital fashion, before the signal is converted into an analog signal by the D/A converter 95. A finite impulse response (FIR) filter can be used for this purpose. FIG. 17 illustrates a single tap FIR filter composed of a flip-flop 98a, a multiplier 98b, and an adder 98c, which will provide enough performance to meet the requirement.

The above description of the first through ninth embodiments of the present invention will now be summarized below.

First, according to the present invention, a digital modulator is designed to use RZ-coded baseband signals. Four roll-off filters and two inverters will run, as part of the modulator, at a predetermined clock frequency, while the other constituents including a P/S converter and a D/A converter should operate at four times the predetermined clock frequency. This lowered operating frequency enables the roll-off filter circuits to be reduced in size as well as in power consumption.

Second, the present invention allows a modulator to use a carrier frequency n times as high as the predetermined clock frequency, through the use of four roll-off filters and appropriate interconnection. This feature allows the roll-off filters to stay at the same scale, even when a high ratio n of carrier frequency to symbol rate is required.

Third, the present invention proposes a digital modulator and a digital demodulator each of which has a carrier oscillator to generate a carrier frequency and another oscillator to produce a difference frequency signal having a frequency equal to the difference between the carrier frequency and a radio frequency. Thanks to this feature, the modulator and demodulator are free from a problem that radio frequency oscillators have to be modified even when it is required to change the carrier frequency.

Fourth, an AGC circuit for a digital demodulator will have a signal level detector for sampling the level of reception signals at a frequency obtained by dividing the sampling frequency by a divisor i. Here, the sampling frequency is (n×4) times the symbol rate, and the divisor i is an integer that is prime to the factor (n×4). Even if a higher carrier frequency is selected, with respect to the symbol rate, some part of the AGC circuit can operate at a slower rate, thus preventing the cost from increasing.

Sixth, a modulator of the present invention can be equipped with an equalizer, disposed next to or before a D/A converter, to boost the higher frequencies in the modulated signal. The ninth embodiment improves the frequency response of the modulator by compensating the output of the D/A converter, thus permitting the modulated signal to have a flat frequency characteristic.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A digital modulator having a modulation circuit with a quadrature amplitude modulation scheme, comprising:

carrier signal supplying means for supplying the modulation circuit with a carrier signal having a carrier frequency derived from a symbol rate;

radio frequency generation means for generating a radio frequency signal having a predetermined radio frequency;

difference frequency generation means for generating a difference frequency signal having a frequency equal to a difference between the predetermined radio frequency and the carrier frequency, by subtracting the carrier signal supplied by said carrier signal supplying means from the radio frequency signal generated by said radio frequency generation means; and upconversion means for converting a frequency of an output of the modulation circuit up to the predetermined radio frequency by using the difference frequency signal generated by said difference frequency generation means, whereby the resultant output frequency equals the predetermined radio frequency independently of the carrier frequency.

2. A digital modulator with a quadrature amplitude modulation scheme, comprising:

modulation means for producing a modulated signal by applying quadrature amplitude modulation to baseband input signals:

digital-to-analog conversion means, coupled to said modulation means, for converting the modulated signal, from digital form to analog form;

high frequency boosting means, coupled to said digital-to-analog conversion means, for increasing amplitude of high frequency components contained in the modulated signal; and low pass filter means, coupled to said high frequency boosting means, for filtering out alias frequency components contained in the modulated signal.

3. A digital modulator with a quadrature amplitude modulation scheme, comprising:

modulation means for producing a modulated signal by applying quadrature amplitude modulation to baseband input signals;

high frequency boosting means, coupled to said modulation means, for increasing amplitude of high frequency components contained in the modulated signal;

digital-to-analog conversion means, coupled to said high frequency boosting means, for converting the modulated signal from digital form to analog form; and low pass filter means, coupled to said digital-to-analog conversion means, for filtering out alias frequency components contained in the modulated signal.

* * * * *